United States Patent
Reeves et al.

(10) Patent No.: US 8,898,443 B2
(45) Date of Patent: Nov. 25, 2014

(54) MULTI-OPERATING SYSTEM

(75) Inventors: Brian Reeves, Hamilton (CA); Paul Reeves, Oakville (CA); Richard Teltz, Hamilton (CA); David Reeves, Ancaster (CA); Sanjiv Sirpal, Oakville (CA); Chris Tyghe, Oakville (CA)

(73) Assignee: Z124, George Town (KY)

( * ) Notice: Subject to any disclaimer, the term of this patent is extended or adjusted under 35 U.S.C. 154(b) by 340 days.

(21) Appl. No.: 13/217,108

(22) Filed: Aug. 24, 2011

(65) Prior Publication Data

US 2012/0084542 A1 Apr. 5, 2012

Related U.S. Application Data

(60) Provisional application No. 61/507,199, filed on Jul. 13, 2011, provisional application No. 61/507,201, filed on Jul. 13, 2011, provisional application No. 61/507,203, filed on Jul. 13, 2011, provisional application No. 61/507,206, filed on Jul. 13, 2011, provisional application No. 61/507,209, filed on Jul. 13, 2011, provisional application No. 61/389,117, filed on Oct. 1, 2010.

(51) Int. Cl.
*G06F 9/00* (2006.01)
*G06F 15/177* (2006.01)
*G06F 13/14* (2006.01)

(52) U.S. Cl.
CPC ........................................ *G06F 13/14* (2013.01)
USPC .................................................. 713/1; 713/2

(58) Field of Classification Search
USPC ........................................................ 713/1, 2
See application file for complete search history.

(56) References Cited

U.S. PATENT DOCUMENTS

| 5,396,630 | A |   | 3/1995  | Banda et al.  |
|-----------|---|---|---------|---------------|
| 5,673,403 | A |   | 9/1997  | Brown et al.  |
| 5,764,984 | A |   | 6/1998  | Loucks        |
| 5,874,928 | A | * | 2/1999  | Kou ................................ 345/1.1 |
| 6,108,715 | A |   | 8/2000  | Leach et al.  |
| 6,157,959 | A |   | 12/2000 | Bonham et al. |
| 6,178,503 | B1|   | 1/2001  | Madden et al. |

(Continued)

FOREIGN PATENT DOCUMENTS

| JP | 7219903  | 8/1995 |
|----|----------|--------|
| JP | 08115144 | 5/1996 |

(Continued)

OTHER PUBLICATIONS

Stallman Richard, GNU Operating System: Android and Users' Freedom, Sep. 2, 2013, http://gnu.org/philosophy/android-and-users-freedom.html.*

(Continued)

*Primary Examiner* — Mark Connolly
(74) *Attorney, Agent, or Firm* — Sheridan Ross P.C.

(57) ABSTRACT

A mobile computing device with a mobile operating system and desktop operating system running concurrently and independently on a shared kernel without virtualization. The mobile operating system provides a user experience for the mobile computing device that suits the mobile environment. The desktop operating system provides a full desktop user experience when the mobile computing device is docked to a secondary terminal environment. The mobile computing device may be a smartphone running the Android mobile OS and a full desktop Linux distribution on a modified Android kernel.

20 Claims, 9 Drawing Sheets

(56) References Cited

U.S. PATENT DOCUMENTS

| | | |
|---|---|---|
| 6,182,158 B1 | 1/2001 | Kougiouris et al. |
| 6,260,075 B1 | 7/2001 | Cabrero et al. |
| 6,477,585 B1 | 11/2002 | Cohen et al. |
| 6,486,890 B1 | 11/2002 | Harada et al. |
| 6,507,336 B1 | 1/2003 | Lunsford |
| 6,573,913 B1 | 6/2003 | Butler et al. |
| 6,694,368 B1 | 2/2004 | An et al. |
| 6,826,703 B2 | 11/2004 | Kawano et al. |
| 6,917,963 B1 | 7/2005 | Hipp et al. |
| 6,927,908 B2 | 8/2005 | Stark |
| 6,961,941 B1 | 11/2005 | Nelson et al. |
| 6,970,173 B2 * | 11/2005 | Ciolac .......................... 345/544 |
| 7,069,519 B1 | 6/2006 | Okude et al. |
| 7,127,723 B2 | 10/2006 | Endo et al. |
| 7,284,203 B1 | 10/2007 | Meeks et al. |
| 7,453,465 B2 | 11/2008 | Schmieder et al. |
| 7,478,341 B2 | 1/2009 | Dove |
| 7,489,503 B2 | 2/2009 | Maatta |
| 7,565,535 B2 | 7/2009 | Roberts et al. |
| 7,681,134 B1 | 3/2010 | Grechishkin et al. |
| 7,705,799 B2 | 4/2010 | Niwa |
| 7,880,728 B2 | 2/2011 | de los Reyes et al. |
| 7,949,633 B1 | 5/2011 | Shaver et al. |
| 7,950,008 B2 | 5/2011 | Bhide et al. |
| 7,960,945 B1 | 6/2011 | Onorato et al. |
| 8,194,001 B2 | 6/2012 | Miller et al. |
| 8,315,665 B2 * | 11/2012 | Kim et al. .................. 455/552.1 |
| 8,397,245 B2 | 3/2013 | Filali-Adib et al. |
| 8,704,777 B2 | 4/2014 | Small et al. |
| 2002/0010844 A1 | 1/2002 | Noel et al. |
| 2002/0130888 A1 | 9/2002 | Perry et al. |
| 2002/0157001 A1 | 10/2002 | Huang et al. |
| 2002/0158811 A1 | 10/2002 | Davis |
| 2003/0001848 A1 | 1/2003 | Doyle et al. |
| 2003/0020954 A1 | 1/2003 | Udom et al. |
| 2003/0079010 A1 | 4/2003 | Osborn |
| 2003/0079205 A1 | 4/2003 | Miyao et al. |
| 2003/0115443 A1 | 6/2003 | Cepulis et al. |
| 2003/0131143 A1 | 7/2003 | Myers |
| 2003/0174172 A1 | 9/2003 | Conrad et al. |
| 2003/0177285 A1 | 9/2003 | Hunt et al. |
| 2003/0179541 A1 | 9/2003 | Sullivan |
| 2003/0226116 A1 | 12/2003 | Kuwata et al. |
| 2004/0137855 A1 | 7/2004 | Wiley et al. |
| 2004/0141085 A1 | 7/2004 | Nickel et al. |
| 2004/0226023 A1 | 11/2004 | Tucker |
| 2005/0034017 A1 | 2/2005 | Airaud et al. |
| 2005/0083642 A1 | 4/2005 | Senpuku et al. |
| 2005/0193267 A1 | 9/2005 | Liu et al. |
| 2005/0216594 A1 | 9/2005 | O'Brien et al. |
| 2005/0237587 A1 | 10/2005 | Nakamura |
| 2005/0246505 A1 | 11/2005 | McKenney et al. |
| 2005/0248501 A1 | 11/2005 | Kim |
| 2006/0010314 A1 | 1/2006 | Xu |
| 2006/0031572 A1 | 2/2006 | Feuerstein et al. |
| 2006/0107020 A1 | 5/2006 | Stillwell, Jr. et al. |
| 2006/0136828 A1 | 6/2006 | Asano |
| 2006/0139862 A1 | 6/2006 | Wang et al. |
| 2006/0183505 A1 | 8/2006 | Willrich |
| 2006/0187142 A1 | 8/2006 | Lesniak |
| 2006/0227806 A1 | 10/2006 | Tseng |
| 2006/0248404 A1 | 11/2006 | Lindsay et al. |
| 2007/0005661 A1 | 1/2007 | Yang |
| 2007/0014295 A1 | 1/2007 | Fernandes et al. |
| 2007/0022155 A1 | 1/2007 | Owens et al. |
| 2007/0033260 A1 | 2/2007 | Grouzdev et al. |
| 2007/0050751 A1 | 3/2007 | Husmann et al. |
| 2007/0067769 A1 | 3/2007 | Geisinger |
| 2007/0085759 A1 | 4/2007 | Lee et al. |
| 2007/0111750 A1 | 5/2007 | Stohr et al. |
| 2007/0136356 A1 | 6/2007 | Smith et al. |
| 2007/0182663 A1 | 8/2007 | Biech |
| 2007/0198760 A1 | 8/2007 | Han |
| 2007/0271522 A1 | 11/2007 | Son et al. |
| 2007/0285401 A1 | 12/2007 | Ohki et al. |
| 2007/0288941 A1 | 12/2007 | Dunshea et al. |
| 2008/0024388 A1 | 1/2008 | Bruce |
| 2008/0057910 A1 | 3/2008 | Thoresson et al. |
| 2008/0062625 A1 | 3/2008 | Batio |
| 2008/0071595 A1 | 3/2008 | Chang et al. |
| 2008/0082815 A1 | 4/2008 | Kawano et al. |
| 2008/0090525 A1 | 4/2008 | Joo |
| 2008/0119237 A1 | 5/2008 | Kim |
| 2008/0119731 A1 | 5/2008 | Becerra et al. |
| 2008/0134061 A1 | 6/2008 | Banerjee et al. |
| 2008/0155103 A1 | 6/2008 | Bailey |
| 2008/0244599 A1 | 10/2008 | Hodson et al. |
| 2008/0291283 A1 | 11/2008 | Achiwa et al. |
| 2008/0299951 A1 | 12/2008 | Karkanias et al. |
| 2009/0037649 A1 | 2/2009 | Xu |
| 2009/0055749 A1 | 2/2009 | Chatterjee et al. |
| 2009/0083829 A1 | 3/2009 | Peterson |
| 2009/0089569 A1 * | 4/2009 | Baribault et al. .................. 713/2 |
| 2009/0100429 A1 | 4/2009 | Thoelke et al. |
| 2009/0109468 A1 | 4/2009 | Barclay et al. |
| 2009/0119580 A1 | 5/2009 | Rohrabaugh et al. |
| 2009/0138818 A1 | 5/2009 | Nemoto |
| 2009/0158299 A1 | 6/2009 | Carter |
| 2009/0164930 A1 | 6/2009 | Chen et al. |
| 2009/0176571 A1 | 7/2009 | Sternberg |
| 2009/0217071 A1 | 8/2009 | Huang et al. |
| 2009/0219254 A1 | 9/2009 | Lai et al. |
| 2009/0249247 A1 | 10/2009 | Tseng et al. |
| 2009/0249331 A1 | 10/2009 | Davis et al. |
| 2009/0256780 A1 | 10/2009 | Small et al. |
| 2009/0257657 A1 | 10/2009 | Temmermans et al. |
| 2009/0278806 A1 | 11/2009 | Duarte et al. |
| 2009/0305743 A1 | 12/2009 | Gouesbet et al. |
| 2009/0313440 A1 | 12/2009 | Kim et al. |
| 2009/0327560 A1 | 12/2009 | Yalovsky |
| 2010/0005396 A1 | 1/2010 | Nason et al. |
| 2010/0007603 A1 | 1/2010 | Kirkup |
| 2010/0013863 A1 | 1/2010 | Harris |
| 2010/0046026 A1 | 2/2010 | Heo |
| 2010/0049775 A1 | 2/2010 | Rajawat |
| 2010/0060549 A1 | 3/2010 | Tsern |
| 2010/0063994 A1 | 3/2010 | Cook et al. |
| 2010/0064228 A1 | 3/2010 | Tsern |
| 2010/0064244 A1 | 3/2010 | Kilpatrick et al. |
| 2010/0064536 A1 | 3/2010 | Caskey et al. |
| 2010/0066763 A1 | 3/2010 | Macdougall et al. |
| 2010/0079355 A1 | 4/2010 | Kilpatrick, II et al. |
| 2010/0085274 A1 | 4/2010 | Kilpatrick et al. |
| 2010/0085301 A1 | 4/2010 | Cohen et al. |
| 2010/0085382 A1 | 4/2010 | Lundqvist et al. |
| 2010/0107163 A1 | 4/2010 | Lee |
| 2010/0122271 A1 | 5/2010 | Labour et al. |
| 2010/0149121 A1 | 6/2010 | Alexander et al. |
| 2010/0157518 A1 | 6/2010 | Ladouceur et al. |
| 2010/0164836 A1 | 7/2010 | Liberatore |
| 2010/0177019 A1 | 7/2010 | Jeong et al. |
| 2010/0177047 A1 | 7/2010 | Brenneman et al. |
| 2010/0207903 A1 | 8/2010 | Kim et al. |
| 2010/0211769 A1 | 8/2010 | Shankar et al. |
| 2010/0245256 A1 | 9/2010 | Estrada et al. |
| 2010/0246119 A1 | 9/2010 | Collopy et al. |
| 2010/0250975 A1 | 9/2010 | Gill et al. |
| 2010/0251233 A1 | 9/2010 | Majewski et al. |
| 2010/0319008 A1 | 12/2010 | Ho |
| 2010/0321275 A1 | 12/2010 | Hinckley et al. |
| 2011/0012858 A1 | 1/2011 | Brookes et al. |
| 2011/0016299 A1 | 1/2011 | Galicia et al. |
| 2011/0016301 A1 | 1/2011 | Galicia et al. |
| 2011/0018901 A1 | 1/2011 | Boorman et al. |
| 2011/0025625 A1 | 2/2011 | Hirako |
| 2011/0034214 A1 | 2/2011 | Hong et al. |
| 2011/0063192 A1 | 3/2011 | Miller et al. |
| 2011/0093691 A1 | 4/2011 | Galicia et al. |
| 2011/0093836 A1 | 4/2011 | Galicia et al. |
| 2011/0096014 A1 | 4/2011 | Fuyuno et al. |
| 2011/0102314 A1 | 5/2011 | Roux |
| 2011/0113329 A1 | 5/2011 | Pusateri |
| 2011/0115737 A1 | 5/2011 | Fuyuno et al. |
| 2011/0126216 A1 | 5/2011 | Galicia et al. |

(56) References Cited

U.S. PATENT DOCUMENTS

| | | |
|---|---|---|
| 2011/0167492 A1 | 7/2011 | Ghosh et al. |
| 2011/0193806 A1 | 8/2011 | Kim et al. |
| 2011/0209102 A1 | 8/2011 | Hinckley et al. |
| 2011/0210922 A1 | 9/2011 | Griffin |
| 2011/0216064 A1 | 9/2011 | Dahl et al. |
| 2011/0225538 A1 | 9/2011 | Oyagi et al. |
| 2011/0239142 A1 | 9/2011 | Steeves et al. |
| 2011/0246904 A1 | 10/2011 | Pinto et al. |
| 2011/0260997 A1 | 10/2011 | Ozaki |
| 2011/0267478 A1 | 11/2011 | Jacobs |
| 2011/0273464 A1 | 11/2011 | Brunner et al. |
| 2011/0273475 A1 | 11/2011 | Herz et al. |
| 2011/0289444 A1 | 11/2011 | Winsky |
| 2011/0291964 A1 | 12/2011 | Chambers et al. |
| 2012/0005602 A1 | 1/2012 | Anttila et al. |
| 2012/0005691 A1 | 1/2012 | Wong et al. |
| 2012/0026069 A1 | 2/2012 | Ohsaki |
| 2012/0060089 A1 | 3/2012 | Heo et al. |
| 2012/0076197 A1 | 3/2012 | Byford et al. |
| 2012/0081278 A1 | 4/2012 | Freedman |
| 2012/0081353 A1 | 4/2012 | Yusupov et al. |
| 2012/0081354 A1 | 4/2012 | Yusupov et al. |
| 2012/0081380 A1 | 4/2012 | Reeves et al. |
| 2012/0081383 A1 | 4/2012 | Reeves et al. |
| 2012/0081396 A1 | 4/2012 | Yusupov et al. |
| 2012/0084480 A1 | 4/2012 | Reeves et al. |
| 2012/0084481 A1 | 4/2012 | Reeves et al. |
| 2012/0084675 A1 | 4/2012 | Sirpal et al. |
| 2012/0084697 A1 | 4/2012 | Reeves |
| 2012/0084791 A1 | 4/2012 | Benedek et al. |
| 2012/0084792 A1 | 4/2012 | Benedek et al. |
| 2012/0084793 A1 | 4/2012 | Reeves et al. |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089906 A1 | 4/2012 | Reeves et al. |
| 2012/0089992 A1 | 4/2012 | Reeves et al. |
| 2012/0094716 A1 | 4/2012 | Reeves |
| 2012/0172088 A1 | 7/2012 | Kirch et al. |
| 2012/0176413 A1 | 7/2012 | Kulik et al. |
| 2012/0188185 A1 | 7/2012 | Cassar |
| 2012/0278747 A1 | 11/2012 | Abraham et al. |
| 2012/0278750 A1 | 11/2012 | Abraham et al. |
| 2013/0019183 A1 | 1/2013 | Reeves et al. |
| 2013/0021262 A1 | 1/2013 | Chen |
| 2013/0024778 A1 | 1/2013 | Reeves et al. |
| 2013/0024812 A1 | 1/2013 | Reeves et al. |
| 2013/0076672 A1 | 3/2013 | Sirpal et al. |
| 2013/0076677 A1 | 3/2013 | Kretz |
| 2013/0076678 A1 | 3/2013 | Kretz |
| 2013/0076679 A1 | 3/2013 | Kretz |
| 2013/0076683 A1 | 3/2013 | Reeves |
| 2013/0079062 A1 | 3/2013 | Sirpal et al. |
| 2013/0080945 A1 | 3/2013 | Reeves |
| 2013/0088411 A1 | 4/2013 | Reeves et al. |
| 2013/0167159 A1* | 6/2013 | Ricci et al. ............. 719/319 |

FOREIGN PATENT DOCUMENTS

| | | |
|---|---|---|
| JP | 2008225546 | 9/2008 |
| KR | 1020020092969 | 12/2002 |
| KR | 100578592 | 5/2006 |
| KR | 1020060081997 | 7/2006 |
| KR | 100616157 | 8/2006 |
| KR | 100883208 | 2/2009 |
| KR | 1020100043434 | 4/2010 |
| WO | WO 2006/075859 | 7/2006 |
| WO | WO 2008/132924 | 11/2008 |

OTHER PUBLICATIONS

Apple iPod, iPad and iPhone dock Connector Pinout—AllPinouts, Sep. 27, 2010, http://www.allpinouts.org/index.php/Apple_iPod,_iPad_and_iPhone_dock.*

How to Install Ubuntu on Your Nexus One/Android!, Jul. 6, 2010, http://nexusonehacks.net/nexus-one-hacks/how-to-install-ubuntu-on-your-android/.*

Haselton Todd, Celio Announces Redfly Smart Phone Dock, Software for Windows PCs, Jan. 8, 2009, http://blog.laptopmag.com/redfly-launches-smartphone-dock-software-for-windows-pcs.*

"Lapdock™ for Motorola ATRIX," at http://www.motorola.com/Consumers/US-EN/Consumer-Product-and-Services/Mobile..., accessed Apr. 18, 2011, 1 page.

"Motorola ATRIX 4G Laptop Dock Review," at http://www.phonearena.com/reviews/Motorola-ATRIX-4G-Laptop-Dock-Review_id2667, Mar. 2, 2011, 6 pages.

Burns, C., "Motorola ATRIX 4G Laptop Dock Review," at http://androidcommunity.com/motorola-atrix-4g-laptop-dock-review-20110220/, Feb. 20, 2011, 5 pages.

Catacchio, Chad, "This smartphone has two huge screens . . . that rotate," The Next Web at http://thenextweb.com/asia/2010/10/07/this-smartphone-has-two-huge-screens-that-rotate/, Jul. 21, 2011, 2 pages.

Google images, accessed Apr. 18, 2011, 6 pages.

Harman03, "Kyocera Echo Dual-screen Android Phone," posted 4 weeks from Apr. 18, 2011, 3 pages.

Stein, S., "How does the Motorola Atrix 4G Lapdock compare with a laptop?" Crave—CNET, at http://news.cnet.com/8301-17938_105-20031251-1.html, Feb. 9, 2011, 7 pages.

Sud, et al., "Dynamic Migration of Computation Through Virtualization of the Mobile Platform," Mobile Networks and Applications, 2012, (published online Feb. 22, 2011), vol. 17, Iss. 2, pp. 206-215.

Website entitled, "Kyocera Echo," at www.echobykyocera.com/, 2011, 6 pages.

Website entitled, "Sony Tablet," at www.store.sony.com/webapp/wcs/stores/servlet/CategoryDisplay?catalogId=10551&storeId=10151&langId=-1&categoryId=8198552921644795521, 2011, 3 pages.

International Search Report for International Patent Application No. PCT/US2011/052988, mailed May 3, 2012, 5 pages.

Written Opinion for International Patent Application No. PCT/US2011/052988, mailed May 3, 2012, 4 pages.

International Search Report for International Patent Application No. PCT/US2011/053037, mailed Mar. 20, 2012, 5 pages.

Written Opinion for International Patent Application No. PCT/US2011/053037, mailed Mar. 20, 2012, 6 pages.

International Search Report for International Patent Application No. PCT/US2011/053127, mailed Apr. 24, 2012, 5 pages.

Written Opinion for International Patent Application No. PCT/US2011/053127, mailed Apr. 24, 2012, 4 pages.

International Search Report for International Patent Application No. PCT/US2011/053130, mailed Apr. 24, 2012, 5 pages.

Written Opinion for International Patent Application No. PCT/US2011/053130, mailed Apr. 24, 2012, 4 pages.

International Search Report for International Patent Application No. PCT/US2011/053665, mailed Apr. 30, 2012, 5 pages.

Written Opinion for International Patent Application No. PCT/US2011/053665, mailed Apr. 30, 2012, 4 pages.

International Search Report for International Patent Application No. PCT/US2011/053691, mailed May 4, 2012, 5 pages.

Written Opinion for International Patent Application No. PCT/US2011/053691, mailed May 4, 2012, 4 pages.

International Search Report for International Patent Application No. PCT/US2011/053826, mailed Apr. 27, 2012, 5 pages.

Written Opinion for International Patent Application No. PCT/US2011/053826, mailed Apr. 27, 2012, 4 pages.

International Search Report for International Patent Application No. PCT/US2011/053909, mailed Apr. 30, 2012, 5 pages.

Written Opinion for International Patent Application No. PCT/US2011/053909, mailed Apr. 30, 2012, 4 pages.

International Search Report for International Patent Application No. PCT/US2011/053923, mailed Apr. 30, 2012, 5 pages.

Written Opinion for International Patent Application No. PCT/US2011/053923, mailed Apr. 30, 2012, 4 pages.

International Search Report for International Patent Application No. PCT/US2011/054017, mailed Apr. 24, 2012, 5 pages.

(56) References Cited

OTHER PUBLICATIONS

Written Opinion for International Patent Application No. PCT/US2011/054017, mailed Apr. 24, 2012, 4 pages.
International Search Report for International Patent Application No. PCT/US2011/054019, mailed Apr. 10, 2012, 5 pages.
Written Opinion for International Patent Application No. PCT/US2011/054019, mailed Apr. 10, 2012, 4 pages.
International Search Report for International Patent Application No. PCT/US2011/054605, mailed Apr. 30, 2012, 5 pages.
Written Opinion for International Patent Application No. PCT/US2011/054605, mailed Apr. 30, 2012, 5 pages.
International Search Report for International Patent Application No. PCT/US2011/054623, mailed Apr. 27, 2012, 5 pages.
Written Opinion for International Patent Application No. PCT/US2011/054623, mailed Apr. 27, 2012, 4 pages.
International Search Report for International Patent Application No. PCT/US2011/056149, mailed Apr. 24, 2012, 5 pages.
Written Opinion for International Patent Application No. PCT/US2011/056149, mailed Apr. 24, 2012, 4 pages.
Official Action for U.S. Appl. No. 12/905,920 mailed Dec. 7, 2012, 13 pages.
Official Action for U.S. Appl. No. 12/905,920 mailed Jul. 3, 2012, 14 pages.
Official Action for U.S. Appl. No. 12/905,920 mailed Mar. 15, 2012, 12 pages.
Official Action for U.S. Appl. No. 13/246,669 mailed Jan. 8, 2013, 14 pages.
U.S. Appl. No. 13/843,086, filed Mar. 15, 2013, Reeves et al.
U.S. Appl. No. 13/485,734, filed May 31, 2012, Reeves et al.
Google Transliteration IME website, 2010, available at www.google.com/ime/transliteration/help.html#features, 8 pages.
InputKing Online Input System, 2011, available at www.inputking.com, 2 pages.
Dutko, "Domo Arigato Mr Androidato—An Introduction to the New Google Mobile Linux Framework, Android," Linux Journal, Mar. 2008, vol. 2008, Iss. 167, 9 pages.
Mikeclay, "Launch Multiple Programs at Once Using Simple Batch File," Feb. 5, 2009 available at www.web.archive.org/web/20090205134920/http://www.windowsreference.com/windows-2000/launch-multiple-programs-at-once-using-simple-batch-file/, 5 pages.
SAKHR Software—Arabic Optical Character Recognition, Jul. 15, 2011, available at www.sakhr.com/ocr.aspx, 1 page.
Wikipedia, "Balloon help," Jul. 18, 2011, available at www.en.wikipedia.org/wiki/Balloon_help, 3 pages.
Wikipedia, "Google Pinyin," Aug. 27, 2011 available at www.en.wikipedia.org/wiki/Google_Pinyin, 3 pages.
Wikipedia, "Mouseover," Sep. 29, 2011, available at www.en.wikipedia.org/wiki/Mouseover, 2 pages.
Wikipedia, "Predictive text," Aug. 7, 2011, available at www.en.wikipedia.org/wiki/Predictive_test, 6 pages.
Wikipedia, "Sogou Pinyin," Jul. 23, 2011 available at www.en.wikipedia.org/wiki/Sogou_Pinyin, 3 pages.
Wikipedia, "Status bar," Sep. 8, 2011, available at www.en.wikipedia.org/wiki/Status_bar, 3 pages.
Wikipedia, "Tooltip," Sep. 17, 2011, available at www.en.wikipedia.org/wiki/Tooltip, 2 pages.
International Search Report and Written Opinion for International Patent Application No. PCT/US2012/046800, mailed Feb. 20, 2013, 9 pages.
International Search Report and Written Opinion for International Patent Application No. PCT/US2012/046802, mailed Feb. 20, 2013, 9 pages.
International Preliminary Report on Patentability for International Patent Application No. PCT/US2011/056149, mailed Apr. 25, 2013, 6 pages.
International Search Report for International Patent Application No. PCT/US11/52822, mailed Apr. 27, 2012, 5 pages.
International Preliminary Report on Patentability for International (PCT) Patent Application No. PCT/US2011/052822, mailed Apr. 11, 2013 7 pages.
International Search Report for International Patent Application No. PCT/US11/52598, mailed Mar. 27, 2012, 3 pages.
International Preliminary Report on Patentability for International (PCT) Patent Application No. PCT/US2011/052598, mailed Apr. 11, 2013 9 pages.
International Search Report for International Patent Application No. PCT/US11/53835, mailed Apr. 30, 2012, 5 pages.
Written Opinion for International Patent Application No. PCT/US11/53835, mailed Apr. 30, 2012, 4 pages.
International Preliminary Report on Patentability for International (PCT) Patent Application No. PCT/US2011/053835, mailed Apr. 11, 2013 6 pages.
International Preliminary Report on Patentability for International Patent Application No. PCT/US2011/053130, mailed Apr. 11, 2013, 6 pages.
International Preliminary Report on Patentability for International Patent Application No. PCT/US2011/053826, mailed Apr. 11, 2013, 6 pages.
International Preliminary Report on Patentability for International Patent Application No. PCT/US2011/052988, mailed Apr. 11, 2013, 6 pages.
International Preliminary Report on Patentability for International Patent Application No. PCT/US2011/054605, mailed Apr. 11, 2013, 7 pages.
International Preliminary Report on Patentability for International Patent Application No. PCT/US2011/053909, mailed Apr. 11, 2013, 6 pages.
International Preliminary Report on Patentability for International Patent Application No. PCT/US2011/054623, mailed Apr. 11, 2013, 6 pages.
International Preliminary Report on Patentability for International Patent Application No. PCT/US2011/053037, mailed Apr. 11, 2013, 8 pages.
International Preliminary Report on Patentability for International Patent Application No. PCT/US2011/053923, mailed Apr. 11, 2013, 6 pages.
International Preliminary Report on Patentability for International Patent Application No. PCT/US2011/054017, mailed Apr. 11, 2013, 6 pages.
International Search Report for International Patent Application No. PCT/US11/54105, mailed Apr. 30, 2012, 3 pages.
International Preliminary Report on Patentability for International (PCT) Patent Application No. PCT/US2011/054105, mailed Apr. 11, 2013 5 pages.
International Search Report for International Patent Application No. PCT/US11/53585, mailed May 4, 2012, 3 pages.
International Preliminary Report on Patentability for International (PCT) Patent Application No. PCT/US2011/053585, mailed Apr. 11, 2013 6 pages.
International Preliminary Report on Patentability for International Patent Application No. PCT/US2011/053665, mailed Apr. 11, 2013, 6 pages.
International Preliminary Report on Patentability for International Patent Application No. PCT/US2011/053691, mailed Apr. 11, 2013, 6 pages.
International Preliminary Report on Patentability for International Patent Application No. PCT/US2011/054019, mailed Apr. 11, 2013, 6 pages.
International Preliminary Report on Patentability for International Patent Application No. PCT/US2011/053127, mailed Apr. 11, 2013, 6 pages.
Official Action for U.S. Appl. No. 13/247,719, mailed Mar. 29, 2013 16 pages.
Official Action for U.S. Appl. No. 13/247,719, mailed Aug. 16, 2013 20 pages.
Official Action for U.S. Appl. No. 13/484,951, mailed Aug. 17, 2012, 13 pages.
Official Action for U.S. Appl. No. 13/484,951, mailed Mar. 11, 2013 11 pages.

(56) References Cited

OTHER PUBLICATIONS

Official Action for U.S. Appl. No. 13/484,951, mailed Jul. 25, 2013 12 pages.
Official Action for U.S. Appl. No. 13/399,901, mailed Aug. 2, 2013 17 pages.
Official Action for U.S. Appl. No. 13/399,936, mailed Sep. 10, 2013 23 pages.
Official Action for U.S. Appl. No. 12/905,920 mailed Apr. 25, 2013, 16 pages.
Official Action for U.S. Appl. No. 12/948,686, mailed Jul. 26, 2013 11 pages.
Official Action for U.S. Appl. No. 12/948,701, mailed Nov. 16, 2012, 16 pages.
Official Action for U.S. Appl. No. 12/948,701, mailed Jun. 7, 2013 16 pages.
Official Action for U.S. Appl. No. 13/246,665, mailed Apr. 24, 2013 30 pages.
Official Action for U.S. Appl. No. 13/246,665, mailed Aug. 28, 2013 33 pages.
Official Action for U.S. Appl. No. 13/217,099 mailed Apr. 10, 2013, 53 pages.
Official Action for U.S. Appl. No. 13/247,885 mailed Mar. 19, 2013, 19 pages.
Notice of Allowance for U.S. Appl. No. 13/247,885, mailed Aug. 29, 2013 12 pages.
Official Action for U.S. Appl. No. 13/247,166 mailed Mar. 21, 2013, 4 pages Restriction Requirement.
Official Action for U.S. Appl. No. 13/247,166, mailed Jul. 2, 2013 12 pages.
Official Action for U.S. Appl. No. 13/217,130 mailed Mar. 15, 2013, 12 pages.
Official Action for U.S. Appl. No. 13/247,170 mailed Apr. 11, 2013, 36 pages.
Official Action for U.S. Appl. No. 13/247,170, mailed Aug. 5, 2013 34 pages.
Official Action for U.S. Appl. No. 13/246,699, mailed Jul. 12, 2013 18 pages.
Notice of Allowance for U.S. Appl. No. 13/246,669, mailed Sep. 11, 2013 16 pages.
Official Action for U.S. Appl. No. 13/246,671, mailed Mar. 27, 2013 34 pages.
Official Action for U.S. Appl. No. 13/246,671, mailed Jul. 15, 2013.
Official Action for U.S. Appl. No. 13/246,128 mailed May 10, 2013, 40 pages.
Official Action for U.S. Appl. No. 13/246,128, mailed Aug. 23, 2013 46 pages.
Official Action for U.S. Appl. No. 13/246,133 mailed Apr. 16, 2013, 25 pages.
Official Action for U.S. Appl. No. 13/246,133, mailed Aug. 23, 2013 32 pages.
Official Action for U.S. Appl. No. 13/246,675 mailed May 1, 2013, 27 pages.
Official Action for U.S. Appl. No. 13/217,121 mailed Mar. 6, 2013, 11 pages.
Official Action for U.S. Appl. No. 13/217,121, mailed Aug. 1, 2013 11 pages.
Official Action for U.S. Appl. No. 13/251,427 mailed Feb. 15, 2013, 18 pages.
Kilpatrick et al., "Securing the X Window System with SELinux," NAI Labs Report No. 03-006, 2003, 33 pages.
Official Action for U.S. Appl. No. 13/399,929, mailed Dec. 3, 2013 21 pages.
Official Action for U.S. Appl. No. 12/905,920, mailed Sep. 30, 2013 20 pages.
Final Action for U.S. Appl. No. 13/217,099, mailed Oct. 9, 2013 74 pages.
Final Action for U.S. Appl. No. 13/251,427, mailed Oct. 21, 2013 17 pages.
Notice of Allowance for U.S. Appl. No. 13/247,166, mailed Nov. 4, 2013 14 pages.
Official Action for U.S. Appl. No. 13/217,130, mailed Sep. 16, 2013 12 pages.
Official Action for U.S. Appl. No. 13/246,671, mailed Nov. 20, 2013 50 pages.
Official Action for U.S. Appl. No. 13/246,675, mailed Sep. 27, 2013 32 pages.
International Search Report for International (PCT) Patent Application No. PCT/US2012/046798, mailed Feb. 20, 2013 3 pages.
International Preliminary Report on Patentability for International (PCT) Patent Application No. PCT/US2012/046798, mailed Jan. 23, 2014 6 pages.
International Preliminary Report on Patentability for International (PCT) Patent Application No. PCT/US2012/046800, mailed Jan. 23, 2014 6 pages.
U.S. Appl. No. 14/068,662, filed Oct. 31, 2013, Benedek.
Extended Search Report for European Patent Application No. 11829766.2, dated Jan. 8, 2014 11 pages.
Official Action for U.S. Appl. No. 13/484,951, mailed Jan. 30, 2014 12 pages.
Final Action for U.S. Appl. No. 13/399,901, mailed Dec. 26, 2013 20 pages.
Official Action for U.S. Appl. No. 12/948,686, mailed Jan. 29, 2014 13 pages.
Notice of Allowance for U.S. Appl. No. 13/247,885, mailed Jan. 9, 2014 8 pages.
Official Action for U.S. Appl. No. 13/250,764, mailed Dec. 11, 2013 23 pages.
Official Action for U.S. Appl. No. 13/247,170, mailed Dec. 11, 2013 47 pages.
Official Action for U.S. Appl. No. 13/246,128, mailed Dec. 26, 2013 43 pages.
Official Action for U.S. Appl. No. 13/246,133, mailed Jan. 15, 2014 37 pages.
Official Action for U.S. Appl. No. 13/217,121, mailed Feb. 10, 2014 12 pages.
McDermott "Porting Android to a new device," Embedded Software, Jan. 28, 2010, 12 pages [retrieved from: http://yidonghan.wordpress.com/2010/01/28/porting-android-to-a-new-device/].
Rebecka & Zingo, "Share memory using ashmem and binder in the android framework," Android Blog, Mar. 22, 2010, 14 pages [retrieved from: http://www.androidenea.com/2010/03/share-memory-using-ashmem-and-binder-in.html].
International Preliminary Report on Patentability for International Patent Application No. PCT/US2010/046802, mailed Jan. 23, 2014, 6 pages.
Notice of Allowance for U.S. Appl. No. 13/484,951, mailed May 12, 2014 7 pages.
Official Action for U.S. Appl. No. 13/624,565, mailed Jun. 5, 2014 30 pages.
Official Action for U.S. Appl. No. 13/628,380, mailed Jun. 5, 2014 16 pages.
Official Action for U.S. Appl. No. 13/629,415, mailed Apr. 25, 2014 16 pages.
Official Action for U.S. Appl. No. 13/399,901, mailed May 1, 2014 17 pages.
Official Action for U.S. Appl. No. 13/399,936, mailed Feb. 20, 2014 27 pages.
Notice of Allowance for U.S. Appl. No. 12/905,920, mailed Feb. 27, 2014 13 pages.
Notice of Allowance for U.S. Appl. No. 12/948,686, mailed May 9, 2014 7 pages.
Official Action for U.S. Appl. No. 12/948,701, mailed Jun. 3, 2014 19 pages.
Official Action for U.S. Appl. No. 13/246,665, mailed Feb. 27, 2014 38 pages.
Official Action for U.S. Appl. No. 13/217,099, mailed May 29, 2014 73 pages.
Official Action for U.S. Appl. No. 13/251,427, mailed May 23, 2014 15 pages.
Official Action for U.S. Appl. No. 13/217,130, mailed Mar. 20, 2014 18 pages.
Official Action for U.S. Appl. No. 13/247,170, mailed Jun. 5, 2014 58 pages.

(56) References Cited

OTHER PUBLICATIONS

Notice of Allowance for U.S. Appl. No. 13/246,669, mailed Apr. 11, 2014 11 pages.
Official Action for U.S. Appl. No. 13/246,671, mailed Jun. 5, 2014 60 pages.
Official Action for U.S. Appl. No. 13/246,675, mailed Mar. 7, 2014 34 pages.
Official Action for European Patent Application No. 11829880.1, mailed Aug. 13, 2014, 5 pages.
Official Action for U.S. Appl. No. 13/247,719, mailed Aug. 29, 2014 21 pages.
Official Action for U.S. Appl. No. 13/628,380, mailed Sep. 12, 2014 16 pages.
Official Action for U.S. Appl. No. 13/628,157, mailed Aug. 14, 2014 7 pages.
Official Action for U.S. Appl. No. 13/628,234, mailed Sep. 12, 2014 9 pages.
Notice of Allowance for U.S. Appl. No. 13/399,936, mailed Sep. 15, 2014 11 pages.
Official Action for U.S. Appl. No. 14/068,662, mailed Jul. 28, 2014 26 pages.
Official Action for U.S. Appl. No. 13/217,130, mailed Aug. 05, 2014 19 pages.
Notice of Allowance for U.S. Appl. No. 13/247,170, mailed Sep. 23, 2014 11 pages.
Notice of Allowance for U.S. Appl. No. 13/246,671, mailed Sep. 25, 2014 9 pages.
Official Action for U.S. Appl. No. 13/246,118, mailed Oct. 8, 2014 10 pages.
Notice of Allowance for U.S. Appl. No. 13/246,675, mailed Jul. 29, 2014 9 pages.

* cited by examiner

MULTI-OPERATING SYSTEM

CROSS-REFERENCE TO RELATED APPLICATIONS

This Application is a non-provisional of and claims the benefit of the filing date of U.S. Provisional Application Nos. 61/389,117, filed Oct. 1, 2010, entitled "Multi-Operating System Portable Docking Device"; 61/507,201, filed Jul. 13, 2011, entitled "Cross-Environment Communication Framework"; 61/507,203, filed Jul. 13, 2011, entitled "Multi-Operating System"; 61/507,206, filed Jul. 13, 2011, entitled "Auto-Configuration of a Docked System in a Multi-OS Environment"; and 61/507,209, filed Jul. 13, 2011, entitled "Auto-Waking of a Suspended Secondary OS in a Dockable System," wherein the entire contents of the foregoing priority applications are incorporated herein by reference for all purposes. This Application further claims the benefit of the filing date of U.S. Provisional Application No. 61/507,199, filed Jul. 13, 2011 entitled "Dockable Mobile Software Architecture."

BACKGROUND

1. Field

This Application relates generally to the field of mobile computing environments, and more particularly to supporting multiple user environments through the use of multiple operating systems in a single mobile computing device.

2. Relevant Background

Mobile computing devices are becoming ubiquitous in today's society. For example, as of the end of 2008, 90 percent of Americans had a mobile wireless device. At the same time, the capabilities of mobile devices are advancing rapidly, including smartphones that integrate advanced computing capabilities with mobile telephony capabilities. Mobile providers have launched hundreds of new smartphones in the last three years based upon several different platforms (e.g., Apple iPhone, Android, BlackBerry, Palm, and Windows Mobile). In the U.S., smartphone penetration reached almost 23% by the middle of 2010, and over 35% in some age-groups. In Europe, the smartphone market grew by 41% from 2009 to 2010, with over 60 million smartphone subscribers as of July 2010 in the five largest European countries alone.

While smartphones are gaining in popularity and computing capability, they provide a limited user experience. Specifically, they typically have an operating system that is modified for mobile device hardware and a restricted set of applications that are available for the modified operating system. For example, many smartphones run Google's Android operating system. Android runs only applications that are specifically developed to run within a Java-based virtual machine runtime environment. In addition, while Android is based on a modified Linux kernel, it uses different standard C libraries, system managers, and services than Linux. Accordingly, applications written for Linux do not run on Android without modification or porting. Similarly, Apple's iPhone uses the iOS mobile operating system. Again, while iOS is derived from Mac OS X, applications developed for OS X do not run on iOS. Therefore, while many applications are available for mobile operating systems such as Android and iOS, many other common applications for desktop operating systems such as Linux and Mac OS X are not available on the mobile platforms.

Accordingly, smartphones are typically suited for a limited set of user experiences and provide applications designed primarily for the mobile environment. In particular, smartphones do not provide a suitable desktop user experience, nor do they run most common desktop applications. As a result, many users carry and use multiple computing devices including a smartphone, laptop, and/or tablet computer. In this instance, each device has its own CPU, memory, file storage, and operating system.

Connectivity and file sharing between smartphones and other computing devices involves linking one device (e.g., smartphone, running a mobile OS) to a second, wholly disparate device (e.g., notebook, desktop, or tablet running a desktop OS), through a wireless or wired connection. Information is shared across devices by synchronizing data between applications running separately on each device. This process, typically called "synching," is cumbersome and generally requires active management by the user.

SUMMARY

Embodiments of the present invention are directed to providing the mobile computing experience of a smartphone and the appropriate user experience of a secondary terminal environment in a single mobile computing device. A secondary terminal environment may be some combination of visual rendering devices (e.g., monitor or display), input devices (e.g., mouse, touch pad, touch-screen, keyboard, etc.), and other computing peripherals (e.g., HDD, optical disc drive, memory stick, camera, printer, etc.) connected to the computing device by a wired (e.g., USB, Firewire, Thunderbolt, etc.) or wireless (e.g., Bluetooth, WiFi, etc.) connection. In embodiments, a mobile operating system associated with the user experience of the mobile environment and a desktop operating system associated with the user experience of the secondary terminal environment are run concurrently and independently on a shared kernel.

According to one aspect consistent with various embodiments, a computing device of a computing system includes a mobile operating system with a first application framework supporting a first application running in a first execution environment on a shared kernel. A desktop operating system runs concurrently with the mobile operating system in a second execution environment on the shared kernel, the desktop operating system includes a second application framework supporting a second application that is incompatible with the first application framework.

According to other aspects consistent with various embodiments, the second application is incompatible with a first set of user libraries of the mobile operating system. In the computing system, the shared kernel may be running on a mobile processor of the computing device. The computing system may include a secondary terminal environment, and the desktop operating system may be associated with the secondary terminal environment. The computing device and the secondary terminal environment may be connected with a single dock connector that includes a display interface and serial communications interface. The mobile operating system may be associated with a first frame buffer in a physical memory device of the computing device and the desktop operating system may be associated with a second frame buffer in the physical memory device. The first frame buffer may be associated with a first display device of the computing device.

According to other aspects consistent with various embodiments, the computing system may include a second display device of a secondary terminal environment and the second frame buffer may be associated with the second display device. The second application may be displayed on the second display device through the second frame buffer. The second execution environment may be logically isolated from the first execution environment on a physical storage device. An input device may be connected to the computing device, and input commands from the input device may be available to the mobile operating system in the first execution environment and to the desktop operating system in the second execution environment. The desktop operating system may access input commands from the input device through the shared kernel.

According to other aspects consistent with various embodiments, the computing device is configured using a boot process that includes the steps of starting, in response to a power on event, a boot loader, establishing, by the boot loader, the first execution environment, starting, by the boot loader, the shared kernel, initializing, by the shared kernel, the mobile operating system, starting, by the shared kernel, the first application framework, starting, in the mobile operating system, a desktop monitor service, establishing, by the desktop monitor service, a second execution environment within the first execution environment, and starting, by the desktop monitor service, the second application framework.

According to other aspects consistent with various embodiments, multiple operating systems may be provided on a single physical processor of a mobile computing device by running a first application on a mobile operating system, the first operating system running on a shared kernel and having a first application framework, and running a second application on a desktop operating system, the desktop operating system running concurrently with the first operating system on the shared kernel and having a second application framework, wherein the second application is incompatible with the first application framework.

According to other aspects consistent with various embodiments, a first frame buffer memory associated with the mobile operating system may be allocated by the shared kernel and a second frame buffer memory associated with the desktop operating system may be allocated by the shared kernel. The mobile operating system may render the first application in the first frame buffer memory through the shared kernel, and the desktop operating system may render the second application in the second frame buffer memory through the shared kernel.

According to other aspects consistent with various embodiments, a computing device includes a computer-readable medium storing instructions for a physical processor. The instructions, when executed, cause the processor to perform steps comprising, running a mobile operating system in a first execution environment on a shared kernel, the mobile operating system having a first application framework supporting a first application, and running a desktop operating system concurrently with the mobile operating system in a second execution environment on the shared kernel, the second operating system having a second application framework supporting a second application, wherein the second application is incompatible with the first application framework. The second execution environment may comprise a chrooted environment. The computing device may include telephony capabilities. The computing device may be, for example, a smartphone.

BRIEF DESCRIPTION OF THE DRAWINGS

Embodiments of the present invention are illustrated in referenced figures of the drawings, in which like numbers refer to like elements throughout the description of the figures.

DETAILED DESCRIPTION

Figure 1:
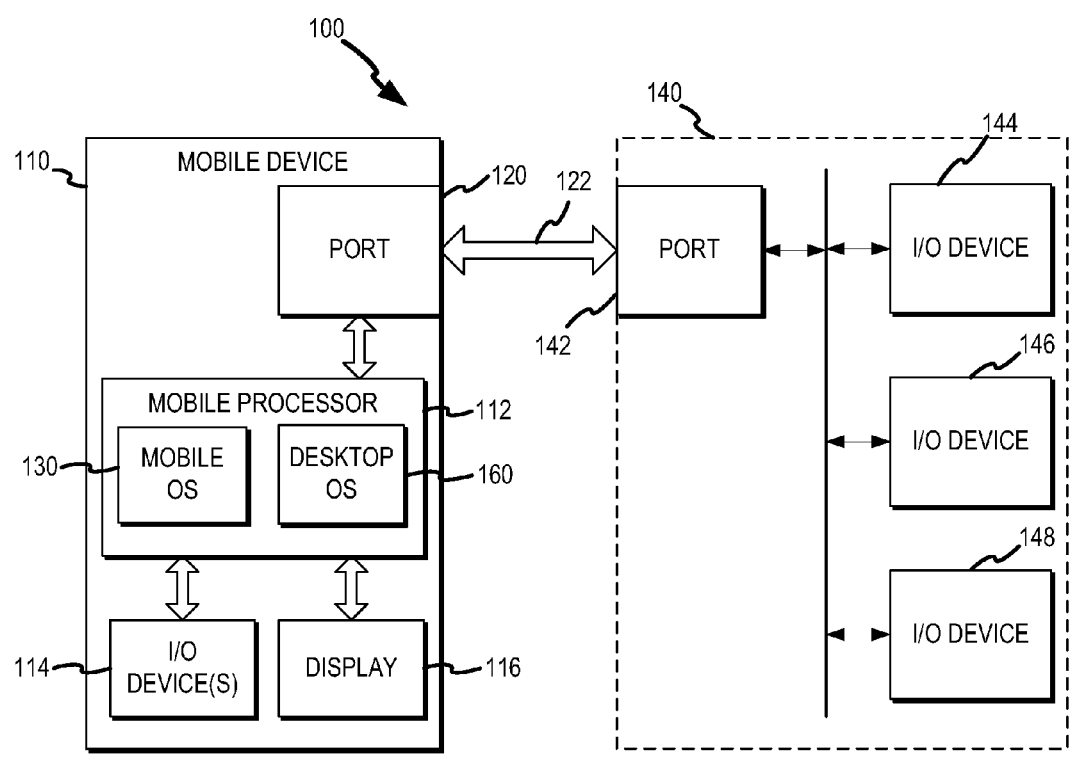
FIG. 1 illustrates a computing environment that provides multiple user computing experiences, according to various embodiments.

Traditionally, handheld mobile telephony devices (i.e., "handsets") were developed independently and served a separate and distinct purpose from that of personal computers ("PCs") such as desktops and laptops. Handheld mobile telephony devices were focused primarily on communication while PCs were focused on computing tasks such as creating and editing documents, text-based communication (e.g., email, etc.), multimedia, and web browsing. However, mobile telephony devices are including ever-increasing computing ability and users increasingly desire convergence of communication and computing capabilities into multi-use mobile devices.

For example, mobile telephony devices called "smartphones" that include computing capabilities are increasing in popularity. Many of these smartphones include a mobile operating system ("OS") running on a mobile processor. While mobile processors and mobile OS's have increased the capabilities of these devices, smartphones have not tended to replace PC environments such as desktop or notebook computers at least because of the limited user experience provided. In particular, for some tasks such as typing or editing documents, a full-size keyboard and large display are easier to use than the user interface components typically found on a smartphone. For example, smartphones typically use a small thumb-style QWERTY keyboard, touch-screen display, click-wheel, and/or scroll-wheel as user interface components. Selecting menu options or items typically involves either using a touch-screen display, or using the click-wheel or scroll-wheel to navigate menus and select items. This interface is suited to the small display screens and limited menu options typically found in smartphones, but not suited to controlling more traditional programs with a larger number of menu options, larger screen area, and user interface built around a pointing device such as a traditional mouse.

Embodiments of the present invention are directed to a single mobile computing device that provides the mobile computing experience of a smartphone, and, when docked to a secondary terminal environment, provides a full user experience appropriate to the secondary terminal environment. A secondary terminal environment may be some combination of visual rendering devices (e.g., monitor or display), input devices (e.g., mouse, touch pad, touch-screen, keyboard, etc.), and other computing peripherals (e.g., HDD, optical disc drive, memory stick, camera, printer, etc.) connected to the computing device by wired (e.g., USB, Firewire, Thunderbolt, etc.) or wireless (e.g., Bluetooth, WiFi, etc.) interfaces. For example, secondary terminal environments may include a docking cradle that connects the mobile computing device to an external display and input devices ("Smartdock"), or integrated device that includes a display, keyboard, and pointing device in a laptop-like enclosure ("Smartbook"). Other secondary terminal environments may include a TV, monitor, projector, in-dash car console, home entertainment system, and/or home automation control system. While secondary terminal environments may have some processing or logic elements such as a microcontroller or other application specific integrated circuits ("ASICs"), they typically do not have a processor that runs a separate instance of an operating system.

FIG. 1 illustrates a computing environment 100 that provides multiple user computing experiences, according to various embodiments. Computing environment 100 includes mobile computing device 110. Mobile computing device 110 includes mobile computing hardware and software components. Hardware components of mobile computing device 110 include mobile processor 114, display 116, I/O device(s) 118, and/or port 120. Software components of mobile computing device 110 include a first OS 130 and a second OS 160. In one embodiment, first OS 130 is a mobile OS and second OS 160 is a desktop OS. When mobile computing device 110 is operated as a stand-alone mobile device, mobile OS 130 presents a typical mobile computing user experience through display 116 and I/O device(s) 118. The mobile computing experience provided by mobile OS 130 typically includes mobile telephony capabilities and a graphical user interface ("GUI") suited to the mobile environment including display 116 and I/O device(s) 118. For example, display 116 may be a touch-screen display and application programs (i.e., "Apps") running on mobile OS 130 may be controlled through the GUI of mobile OS 130 on touch-screen display 116.

Mobile computing device 110 may be connected to I/O devices 144, 146 and/or 148 through port 120. I/O devices 144, 146, and/or 148 may make up a secondary terminal environment 140. In some instances, secondary terminal environment 140 may be more suited to desktop OS 160 than mobile OS 130. For example, secondary terminal environment 140 may include a keyboard 144, pointing device 146, and a display device 148. In these instances, desktop OS 160 can be associated with secondary terminal environment 140 to provide the full capabilities of a notebook or desktop computer environment through secondary terminal environment 140. In other instances, secondary terminal environment 140 may be more suited for mobile OS 130 than desktop OS 160. For example, secondary terminal environment 140 may include a touch-screen display. In these instances, mobile OS 130 may be associated with secondary terminal environment 140.

In FIG. 1, port 120 is shown as connected to port 142 of secondary terminal environment 140 through interface 120. However, port 120 may include separate connections to each I/O device 144, 146 and 148 through interface 122. Interface 122 may be any suitable wired or wireless interface or combination of wired and wireless interfaces for connecting devices such as keyboards, monitors, pointing devices, etc. For example, interface 122 may be a combination of a display interface (e.g., VGA, DVI, HDMI, etc.) and a device communications interface (e.g., USB, Bluetooth, Firewire, other serial communications interface, etc.). Alternatively, interface 122 may be a single communications interface that supports both video and device communications signals (e.g., Thunderbolt, etc.).

Traditionally, the hardware and software development paths for the handset environment and the PC environment have been completely independent because of different use models and competing constraints on product design. PCs, including desktop and laptop computers, are designed to be flexible and powerful. Specifically, PC hardware architecture is typically based around a general purpose PC processor connected to memory, graphics, and external components through various general purpose interfaces on a motherboard. For example, a personal computer motherboard may include a processor connected through a logic chipset to a graphics processor, system memory (e.g., RAM), and various other components through communication interfaces (PCI, USB, ISA, IDE, etc.). Some more highly integrated PC processors include an interface to a graphics processor (e.g., AGP, etc.) and/or interface to system memory (e.g., SDR, DDR, DDR2, DDR3, DRDRAM, etc.) on the processor.

PC processors are optimized for high processor clock speed and computationally intensive tasks. The personal computer market is presently dominated by processors based on the x86 CPU architecture. Current x86-based PC processors for desktop computers have multiple 64-bit central processing units ('CPUs") (or "cores") with clock speeds exceeding 2.5 GHz and power consumption approaching 100 Watts. Current x86-based PC processors for laptop computers typically run at clock speeds up to 2.0 GHz and have power consumption in the range of 15-45 Watts. Because of the large power consumption of these processors, desktop and laptop computers may require cooling devices such as fans or heatsinks to remove waste heat from the processor. In addition, the battery life of laptop computers using x86-based PC processors is typically less than four hours.

In contrast, mobile processors for handsets are optimized for low power consumption and a high level of integration to reduce the overall size of the handset. For example, mobile processors for handsets such as smartphones typically run at clock speeds lower than 2.0 GHz, have power consumption of less than 1 Watt, and integrate functions common to the mobile environment such as graphics controllers, communications interfaces, and camera controllers. The most common mobile processor architectures are reduced instruction set computing ("RISC") processor architectures. Specifically, the "ARM" mobile processor architecture is currently the predominant architecture for mobile processors designed for smartphones and other ultra-portable and low power computing devices. Some PC processor manufacturers also refer to PC processors designed for use in laptop computers as "mobile processors." However, as used herein, the term "mobile processor" refers to a processor suited for use in a handset or smartphone, typically consuming less than 1 Watt and integrating mobile functionality.

Personal computers and handsets also typically have different system resources, input/output ("I/O") devices, and peripherals. For example, desktop and laptop computers typically have much larger amounts of system memory and storage capacity than handsets. While a typical laptop computer may have more than 2 GB of RAM and a hard-drive with a capacity of more than 250 GB, handsets typically have less than 512 MB of RAM and a solid-state drive with a capacity of less than 32 GB. User interface components of personal computers typically include a display screen larger than 9 inches diagonally, a full keyboard, and pointing device(s) for user input. In contrast, handsets typically include a display screen smaller than 7 inches diagonally and user interface components such as a thumb-style QWERTY keyboard, touch-screen display, click-wheel, and/or scroll-wheel. Peripherals found on personal computers typically include an optical disk drive (e.g., CD, DVD, DVD-RW, etc.), expansion ports (e.g., PCMCIA, SCSI, Express Card, etc.), video output port (e.g., VGA, DVI, HDMI, etc.), and generic device ports (e.g., USB, etc.). In contrast, handsets typically do not have optical disk drives or expansion ports. However, other devices are typically integrated into handsets including wireless communications interface(s) (e.g., GSM, CDMA, LTE, EDGE, WiFi, WiMax, etc.), GPS chipset, accelerometer, camera(s), and/or solid-state memory port (SD, Memory Stick, etc.).

Software for personal computers and handsets has also traditionally been developed independently. For example, personal computers including desktops and laptops typically run different operating systems than mobile devices. An operating system is software that manages computer hardware and resources and provides common services for execution of applications software on the computer hardware. Operating systems are generally described as having various abstraction layers, where each layer interfaces with the layer below through an interface.

Generally, the kernel of an operating system refers to the core OS layer that manages the computing devices resources such as the CPU(s) (CPU scheduling), memory, and I/O (including peripheral and file system access). A kernel will usually provide features for low-level scheduling of processes (dispatching), inter-process communication, process synchronization, context switching, manipulation of process control blocks, interrupt handling, process creation and destruction, and process suspension and resumption. The OS kernel may or may not include device drivers. Other layers of the OS interface with the kernel through system calls or an application programming interface ("API") layer.

Generally, other OS layers include the libraries layer, application framework layer, and application layer. The libraries layer typically includes system libraries and other user libraries. The application framework layer includes services, managers, and runtime environments. The application layer includes user applications, which may run within a runtime environment of the application framework layer. A user interacts with the OS through the OS GUI. The GUI presents menus, buttons, and controls that the user selects to control and use applications running on the OS. Commonly, the term "desktop environment" is used to refer to a style of GUI through which the user interfaces with the OS using icons, windows, toolbars, folders, and/or desktop widgets, and is not limited to a desktop OS. For example, a mobile OS could have a desktop environment, referring to the look and feel of the mobile OS GUI.

Operating systems for personal computers (desktop OSs) were designed for multi-tasking, larger screen areas, and to provide a flexible environment for application developers. As used herein, the term desktop OS refers to an operating system designed for use with a personal computer environment, for example a desktop or laptop use environment. Examples of desktop OS's include various distributions of Linux, Mac OS X, and Windows 7, among many others.

Operating systems for mobile devices (mobile OSs) were developed for the smaller screen area, lower processing power, smaller memory, and smaller disk space typically found on handsets and smartphones. Example mobile OSs include Android, Apple's iOS (for the iPhone and iPad), Microsoft's Windows Mobile (superseded by Windows Phone 7), Nokia's Symbian, and Palm's Palm OS (superseded by HP webOS). As used herein, the term mobile OS refers to an operating system designed for use with a mobile environment including running on a low-power processor with reduced system resources compared to the PC environment (i.e., desktop or laptop computer system).

Mobile operating systems generally have a particular application development environment that is used to create application programs (i.e., "apps") that run on the mobile OS. The application development environment both facilitates application development by providing common tools and APIs for accessing system resources and services, and limits what applications are allowed to do such that the mobile device is able to continue to provide other required functions. For example, incoming phone calls and texts may interrupt a running application to notify the user of the incoming call or text.

The most widely adopted mobile OS is Google's Android. While Android is based on Linux, it includes modifications to the kernel and other OS layers for the mobile environment and mobile processors. In particular, while the Linux kernel is designed for the x86 CPU architecture, the Android kernel is modified for ARM-based mobile processors. Android device drivers are also particularly tailored for devices typically present in a mobile hardware architecture including touchscreens, mobile connectivity (GSM/EDGE, CDMA, Wi-Fi, etc.), battery management, GPS, accelerometers, and camera modules, among other devices.

In Android, applications run within the Dalvik virtual machine on an object-oriented application framework designed specifically for the memory and processor speed constraints of mobile hardware architectures. Applications are developed for the Dalvik virtual machine through the Android SDK. In addition, Android does not have a native X Window System nor does it support the full set of standard GNU libraries, and this makes it difficult to port existing GNU/Linux applications or libraries to Android.

Apple's iOS operating system (run on the iPhone) and Microsoft's Windows Phone 7 are similarly modified for the mobile environment and mobile hardware architecture. For example, while iOS is derived from the Mac OS X desktop OS, common Mac OS X applications do not run natively on iOS. Specifically, applications are developed for iOS through an SDK to run within the "Cocoa Touch" runtime environment of iOS, which provides basic application infrastructure and support for key iOS features such as touch-based input, push notifications, and system services. Therefore, applications written for Mac OS X do not run on iOS without porting them through the iOS SDK. In addition, it may be difficult to port Mac OS X applications to iOS because of differences between user libraries and application framework layers of the two OSs, and differences in system resources of the mobile and desktop hardware.

Because of the differences in processing requirements, system resources, and application development, applications developed for desktop OSs typically do not run on mobile OSs. Additionally, desktop applications may not be easily ported to mobile OSs because they are optimized for a larger screen area, more processing speed, more system memory, different libraries, and commonly a different GUI. As a result, users typically use separate computing devices for each user environment, including a smartphone, tablet computer, laptop computer, and/or desktop computer. In this instance, each device has its own CPU, memory, file storage, and OS.

Connectivity and file sharing between smartphones and other devices involves linking one device (e.g., smartphone, running a mobile OS) to a second, wholly disparate device (e.g., notebook, desktop, or tablet running a desktop OS), through a wireless or wired connection. Information is shared across devices by synchronizing data between applications running separately on each device. This process, typically called "synching," is cumbersome and generally requires active management by the user.

Recently, some attempts have been made to provide a more complete user experience with a single mobile computing device. For example, a smartphone may be connected to an external monitor and input devices such as a full keyboard to provide a more desktop-like user experience, with the mobile OS graphical user interface extended to the larger screen and accepting input from the input devices. However, because the external monitor and input devices are only an extension of the smartphone's operating system and user interface, the capabilities of the docked environment are limited by the smartphone's mobile OS. For example, many software applications available on desktop OSs are not available or have limited functionality on mobile OSs. Accordingly, these devices do not present a full desktop user experience when connected to an external environment.

Referring still to FIG. 1, computing environment 100 provides multiple user computing experiences without the above limitations. Specifically, because mobile computing device 110 includes multiple OSs, where each OS is suited to a particular computing environment, mobile computing device 110 may be adapted with external devices to provide a broad range of user experiences with a single mobile computing device. For example, a user may have a mobile computing device 110 and a secondary terminal environment 140 that provides the user experience of a laptop when connected to mobile computing device 110. In this instance, desktop OS 160 of the mobile computing device is associated with the secondary terminal environment 140 when the secondary terminal environment is connected to mobile computing device 110. To the user, the full capabilities of desktop OS 160 are available through secondary terminal environment 140.

Figure 2:
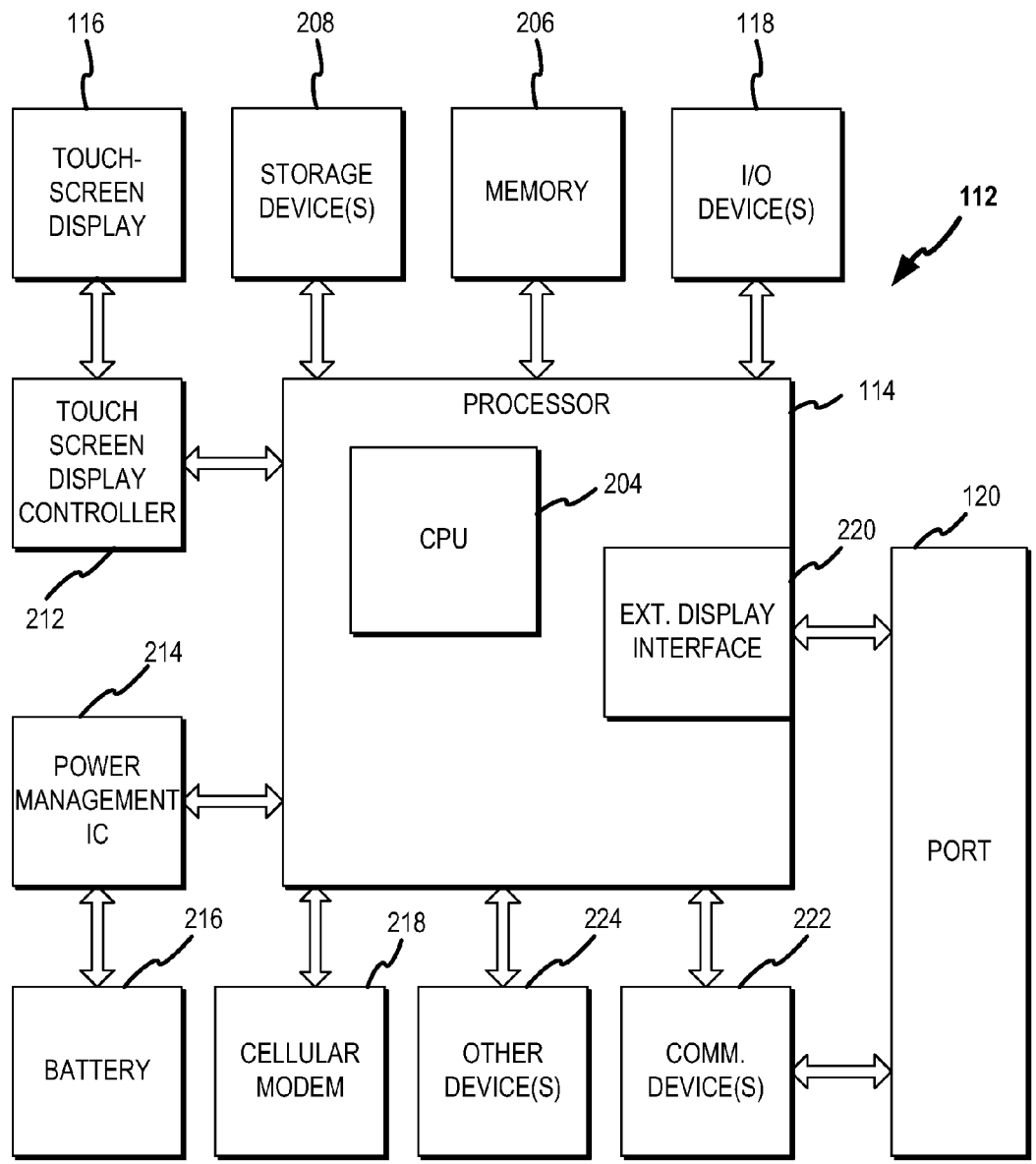
FIG. 2 illustrates an exemplary system architecture for a mobile computing device, according to various embodiments.

FIG. 2 illustrates an exemplary hardware system architecture for mobile computing device 110, according to various embodiments. Mobile computing device hardware 112 includes mobile processor 114 that includes one or more CPU cores 204 and external display interface 220. Generally, mobile computing device hardware 112 also includes I/O device(s) 118, memory 206, storage device(s) 208, touch-screen display controller 210 connected to touch-screen display 116, power management IC 214 connected to battery 216, cellular modem 218, communication device(s) 222, and/or other device(s) 224 that are connected to processor 114 through various communication signals and interfaces. I/O device(s) 118 generally includes buttons and other user interface components that may be employed in mobile computing device 110. For example, I/O device(s) 118 may include a set of buttons, (e.g., back, menu, home, search, etc.), off-screen gesture area, click-wheel, scroll-wheel, QWERTY keyboard, etc. Other device(s) 224 may include, for example, GPS devices, LAN connectivity, microphones, speakers, cameras, accelerometers, and/or MS/MMC/SD/SDIO card interfaces. External display interface 220 may be any suitable display interface (e.g., VGA, DVI, HDMI, etc.).

Processor 114 may be an ARM-based mobile processor. In embodiments, mobile processor 114 is a mobile ARM-based processor such as Texas Instruments OMAP3430, Marvell PXA320, Freescale iMX51, or Qualcomm QSD8650/8250. However, mobile processor 114 may be another suitable ARM-based mobile processor or processor based on other processor architectures such as, for example, x86-based processor architectures or other RISC-based processor architectures.

While FIG. 2 illustrates one exemplary hardware implementation 112 for mobile computing device 110, other architectures are contemplated as within the scope of the invention. For example, various components illustrated in FIG. 2 as external to mobile processor 114 may be integrated into mobile processor 114. Optionally, external display interface 220, shown in FIG. 2 as integrated into mobile processor 114, may be external to mobile processor 114. Additionally, other computer architectures employing a system bus, discrete graphics processor, and/or other architectural variations are suitable for employing aspects of the present invention.

Figure 3:
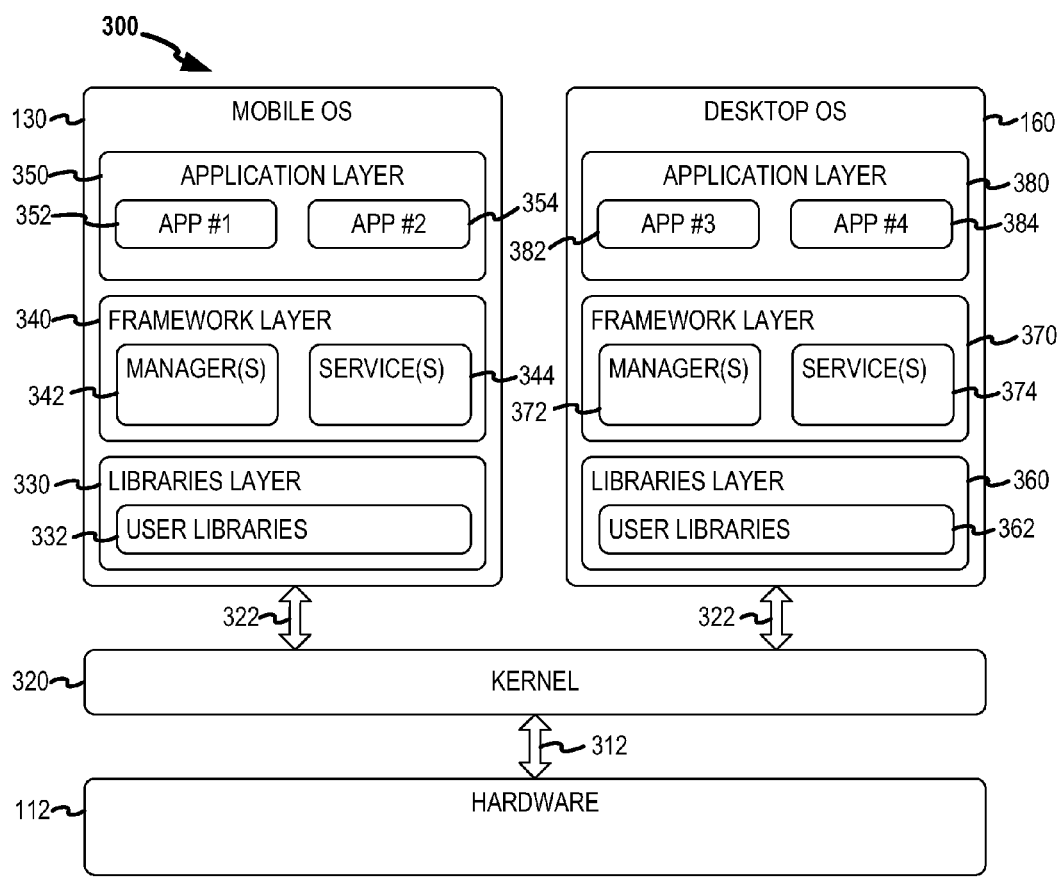
FIG. 3 illustrates an operating system architecture for a computing environment, according to various embodiments.

FIG. 3 illustrates OS architecture 300 that may be employed to run mobile OS 130 and desktop OS 160 concurrently on mobile computing device 110, according to various embodiments. As illustrated in FIG. 3, mobile OS 130 and desktop OS 160 are independent operating systems. Specifically, mobile OS 130 and desktop OS 160 may have independent and incompatible user libraries and/or framework layers. Functions and instructions for OS architecture 300 may be stored as computer program code on a tangible computer readable medium of mobile computing device 110. For example, instructions for OS architecture 300 may be stored in storage device(s) 208 of mobile computing device hardware 112.

As illustrated in FIG. 3, mobile OS 130 has libraries layer 330, application framework layer 340, and application layer 350. In mobile OS 130, applications 352 and 354 run in application layer 350 supported by application framework layer 340 of mobile OS 130. Application framework layer 340 includes manager(s) 342 and service(s) 344 that are used by applications running on mobile OS 130. For example, application framework layer 340 may include a window manager, activity manager, package manager, resource manager, telephony manager, gesture controller, and/or other managers and services for the mobile environment. Application framework layer 340 may include a mobile application runtime environment that executes applications developed for mobile OS 130. The mobile application runtime environment may be optimized for mobile computing resources such as lower processing power or limited memory space. The mobile application runtime environment may rely on the kernel for process isolation, memory management, and threading support. Libraries layer 330 includes user libraries 332 that implement common functions such as I/O and string manipulation ("standard C libraries"), graphics libraries, database libraries, communication libraries, and/or other libraries.

As illustrated in FIG. 3, desktop OS 160 has libraries layer 360, framework layer 370, and application layer 380. In desktop OS 160, applications 382 and 384 run in application layer 380 supported by application framework layer 370 of desktop OS 160. Application framework layer 370 includes manager(s) 372 and service(s) 374 that are used by applications running on desktop OS 160. For example, application framework layer 370 may include a window manager, activity manager, package manager, resource manager, and/or other managers and services common to a desktop environment. Libraries layer 360 may include user libraries 362 that implement common functions such as I/O and string manipulation ("standard C libraries"), graphics libraries, database libraries, communication libraries, and/or other libraries.

In various embodiments of the present disclosure, desktop OS 160 runs in a separate execution environment from mobile OS 130. For example, mobile OS 130 may run in a root execution environment and desktop OS 160 may run in a secondary execution environment established under the root execution environment. Processes and applications running on mobile OS 130 access user libraries 332, manager(s) 342 and service(s) 344 in the root execution environment. Processes and applications running on desktop OS 160 access user libraries 362, manager(s) 372 and service(s) 374 in the secondary execution environment.

Generally applications developed for mobile OS 130 do not run directly on desktop OS 160, and applications developed for desktop OS 160 do not run directly on mobile OS 130. For example, application 382 running in application layer 380 of desktop OS 160 may be incompatible with mobile OS 130, meaning that application 382 could not run on mobile OS 130. Specifically, application 382 may use manager(s) 372 and service(s) 374 of application framework layer 370 of desktop OS 160 that are either not available or not compatible with manager(s) 342 and service(s) 344 in application framework layer 340 in mobile OS 130. In addition, application 382 may attempt to access user libraries 362 that exist in libraries layer 360 of desktop OS 160 but are either not available or not compatible with user libraries 332 available in libraries layer 330 of mobile OS 130.

In OS architecture 300, mobile OS 130 and desktop OS 160 run concurrently on shared kernel 320. This means that mobile OS 130 and desktop OS 160 are running on shared kernel 320 at the same time. Specifically, mobile OS 130 and desktop OS 160 both interface to shared kernel 320 through the same kernel interface 322, for example, by making system calls to shared kernel 320. Shared kernel 320 manages task scheduling for processes of both mobile OS 130 and desktop OS 160. In this regard, mobile OS 130 and desktop OS 160 are running independently and concurrently on shared kernel 320. In addition, shared kernel 320 runs directly on mobile processor 114 of mobile computing device hardware 112, as illustrated by hardware interface 312. Specifically, shared kernel 320 directly manages the computing resources of mobile computing device hardware 112 such as CPU scheduling, memory access, and I/O. In this regard, hardware resources are not virtualized, meaning that mobile OS 130 and desktop OS 160 make system calls through kernel interface 322 without virtualized memory or I/O access.

There are several known techniques for providing multiple OS's on the same computing device. However, none of these techniques provide multiple different OS's running concurrently and independently on a shared kernel. More particularly, none of these techniques provide a solution for a mobile OS and a desktop OS running on a shared kernel.

In one technique, known as dual-boot, multiple OS's are loaded on the computing device one at a time. For example, at boot time, a user may select one OS from multiple available OSs to be run on the device, where each OS has its own kernel, libraries, framework, and applications. The system then boots up into that operating system and the other OS(s) are not running (i.e., no processes of the other OS(s) are loaded concurrently with the running OS). Therefore, this technique does not run multiple OS's on a shared kernel, nor does this technique run multiple OSs concurrently.

Another technique for running multiple OS's on the same device is to use a Virtual Machine Manager ("VMM"), or "Hypervisor." A VMM or Hypervisor runs directly on the hardware and separates the individual kernels of each OS from the hardware, controlling which computer hardware resources are available to each OS at any given time. A Hypervisor effectively creates multiple virtual machines from one device, such that each OS sees a separate virtual machine. Therefore, multiple OSs running on the same device through Hypervisor and VMM are not running on a shared kernel. The Hypervisor adds system overhead due to each OS having to access system resources through virtualization in the Hypervisor. Additionally, because the Hypervisor must allocate CPU and other computing resources, each OS may not be able to effectively schedule processes and tasks.

Yet another technique for running multiple OSs on the same device is to use a hosted virtual machine. In this technique, each OS has its own kernel, with the kernel of the guest OS running on a virtual machine in the host OS. The virtual machine may be a virtualized hardware platform different than the physical hardware platform. The virtual machine in the host OS may be implemented in the kernel of the host OS. In this instance, the kernel of the host OS acts as a hypervisor through which the kernel of the guest OS accesses the processor and hardware resources. Regardless of where the virtual machine is implemented in this technique, the host OS and the guest OS have separate kernels. Therefore, hosted virtual machines do not have multiple OSs running on a shared kernel. System performance using this technique may be reduced due to virtualization of hardware resources for the guest OS.

Another form of virtualization is operating system level virtualization. In this technique, multiple isolated user-space instances may be created on the kernel of an operating system, which look like separate OS instances from the point of view of users of each user-space instance. In this technique, the host OS and guest OS(s) must be the same OS. Accordingly, this technique does not provide a solution for a mobile OS and desktop OS running independently and concurrently on a shared kernel. Further, similarly to a hosted virtual machine, this technique uses disk space and memory virtualization for the guest OS(s). Accordingly, this technique does not provide direct access to memory and system resources for each concurrent OS.

These techniques of running multiple OS's have limitations with regard to running both operating systems concurrently and independently. For example, virtualization involves setting up a distinct address space for the guest OS and simulating I/O to the guest OS. Therefore, access to hardware including system memory has higher overhead for the guest OS using virtualization. Additionally, techniques using Hypervisors result in lack of certainty in process control of each OS. Specifically, the Hypervisor manages the amount of CPU time allocated to each OS, and each OS then allocates CPU time for processes within the OS, without knowledge of what is occurring in the other OS. In this regard, high priority processes within one OS may not be given the required CPU time to complete their tasks because the OS is sharing CPU time through the Hypervisor, which cannot account for the relative priorities of processes running within each OS. Because processing power may be limited in mobile processor architectures relative to desktop processor architectures, techniques that depend on virtualization, including hypervisors, and operating system level virtualization, may not offer optimal performance for a desktop OS running concurrently with a mobile OS on a mobile processor.

Figure 4:
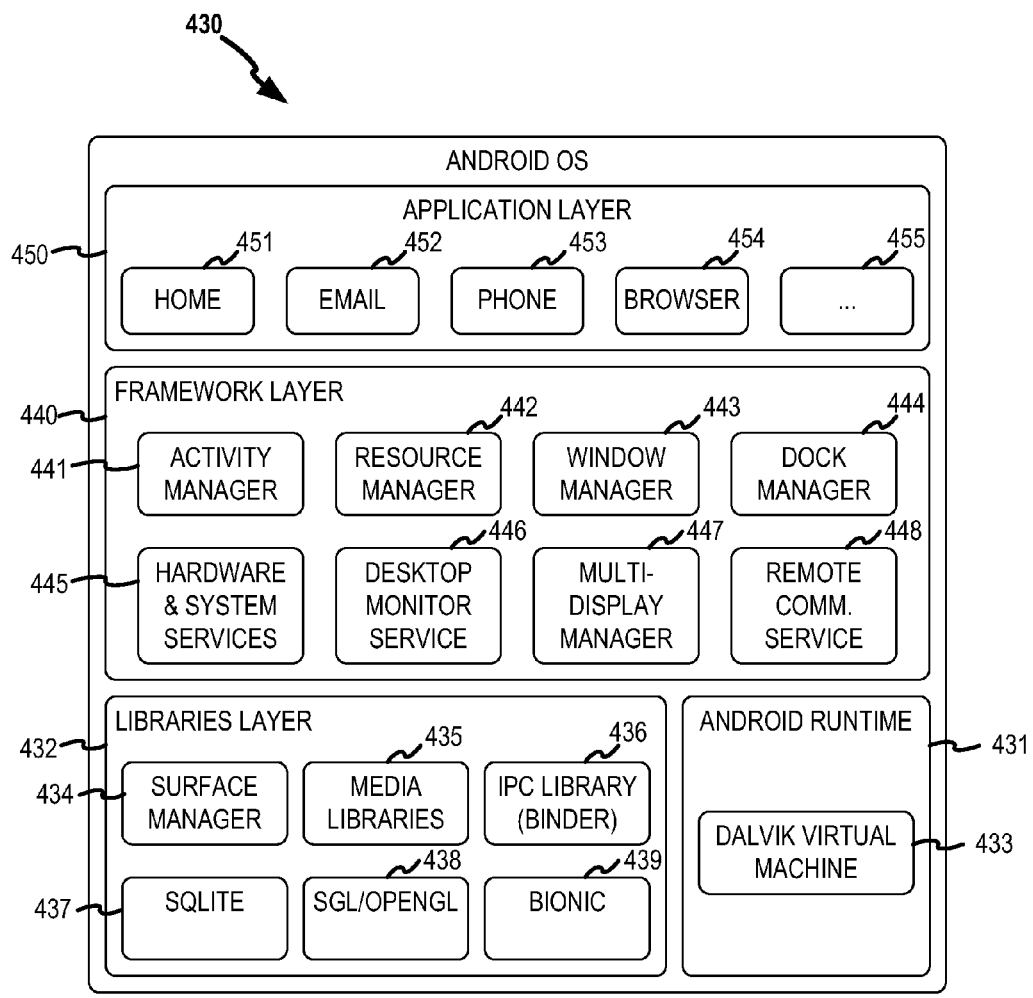
FIG. 4 illustrates aspects of a mobile operating system for a computing environment, according to various embodiments.
Figure 5:
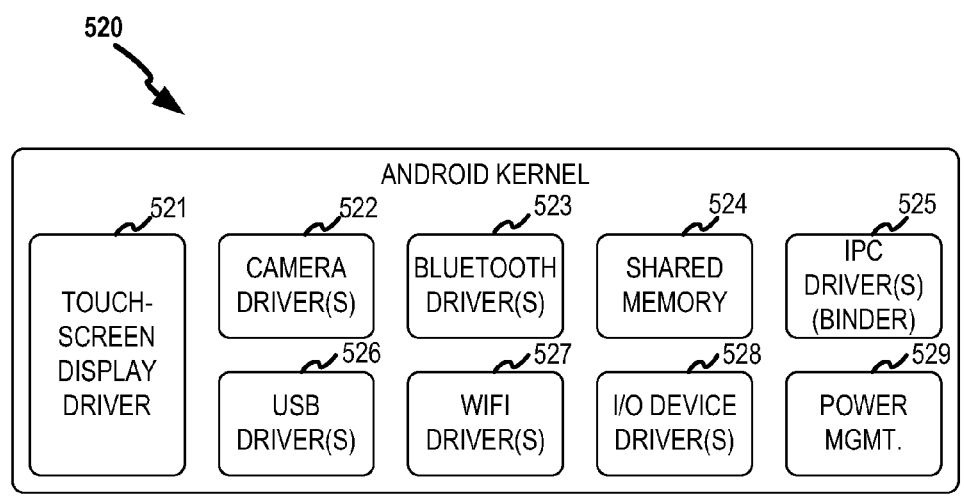
FIG. 5 illustrates aspects of a shared kernel for a computing environment, according to various embodiments.
Figure 6:
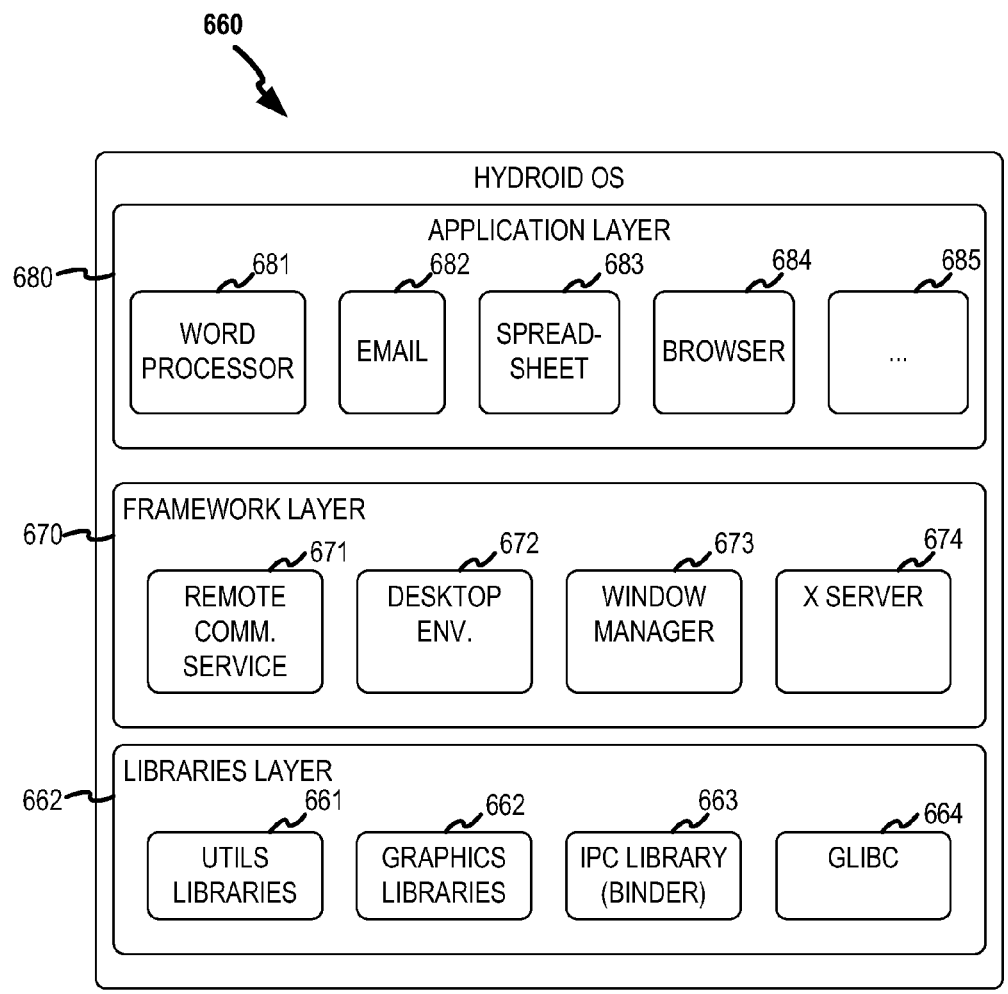
FIG. 6 illustrates aspects of a desktop operating system for a computing environment, according to various embodiments.

In one embodiment consistent with OS architecture 300, an Android mobile OS and a full Linux OS run independently and concurrently on a modified Android kernel. In this embodiment, the Android OS may be a modified Android distribution while the Linux OS ("Hydroid") is a modified Debian Linux desktop OS. FIGS. 4-6 illustrate Android mobile OS 430, Android kernel 520, and Hydroid OS 660 that may be employed in OS architecture 300 in more detail.

As illustrated in FIG. 4, Android OS 430 includes a set of C/C++ libraries in libraries layer 432 that are accessed through application framework layer 440. Libraries layer 432 includes the "bionic" system C library 439 that was developed specifically for Android to be smaller and faster than the "glibc" Linux C-library. Libraries layer 432 also includes inter-process communication ("IPC") library 436, which includes the base classes for the "Binder" IPC mechanism of the Android OS. Binder was developed specifically for Android to allow communication between processes and services. Other libraries shown in libraries layer 432 in FIG. 4 include media libraries 435 that support recording and playback of media formats, surface manager 434 that managers access to the display subsystem and composites graphic layers from multiple applications, 2D and 3D graphics engines 438, and lightweight relational database engine 437. Other libraries that may be included in libraries layer 432 but are not pictured in FIG. 4 include bitmap and vector font rendering libraries, utilities libraries, browser tools (i.e., WebKit, etc.), and/or secure communication libraries (i.e., SSL, etc.).

Application framework layer 440 of Android OS 430 provides a development platform that allows developers to use components of the device hardware, access location information, run background services, set alarms, add notifications to the status bar, etc. Framework layer 440 also allows applications to publish their capabilities and make use of the published capabilities of other applications. Components of application framework layer 440 of Android mobile OS 430 include activity manager 441, resource manager 442, window manager 443, dock manager 444, hardware and system services 445, desktop monitor service 446, multi-display manager 447, and remote communication service 448. Other components that may be included in framework layer 440 of Android mobile OS 430 include a view system, telephony manager, package manager, location manager, and/or notification manager, among other managers and services.

Applications running on Android OS 430 run within the Dalvik virtual machine 431 in the Android runtime environment 433 on top of the Android object-oriented application framework. Dalvik virtual machine 431 is a register-based virtual machine, and runs a compact executable format that is designed to reduce memory usage and processing requirements. Applications running on Android OS 430 include home screen 451, email application 452, phone application 453, browser application 454, and/or other application(s) ("App(s)") 455.

For these reasons, applications written for Android do not generally run on desktop Linux distributions such as Hydroid OS 660 and applications written for standard Linux distributions do not generally run on Android OS 430. In this regard, applications for Android OS 430 and Hydroid OS 660 are not bytecode compatible, meaning compiled and executable programs for one do not run on the other.

FIG. 5 illustrates modified Android kernel 520 in more detail, according to various embodiments. Modified Android kernel 520 includes touch-screen display driver 521, camera driver(s) 522, Bluetooth driver(s) 523, shared memory allocator 524, IPC driver(s) 525, USB driver(s) 526, WiFi driver(s) 527, I/O device driver(s) 528, and/or power management module 529. I/O device driver(s) 528 includes device drivers for external I/O devices, including devices that may be connected to mobile computing device 110 through port 120. Modified Android kernel 520 may include other drivers and functional blocks including a low memory killer, kernel debugger, logging capability, and/or other hardware device drivers.

FIG. 6 illustrates Hydroid OS 660 in more detail, according to various embodiments. Hydroid is a full Linux OS that is capable of running almost any application developed for standard Linux distributions. In particular, libraries layer 662 of Hydroid OS 660 includes Linux libraries that support networking, graphics processing, database management, and other common program functions. For example, user libraries 662 may include the standard Linux C library (glibc) 664, Linux graphics libraries 662 (e.g., GTK, etc.), Linux utilities libraries 661, Linux database libraries, and/or other Linux user libraries. Applications run on Hydroid within an X-Windows Linux graphical environment using X-Server 674, window manager 673, and/or desktop environment 672. Illustrated applications include word processor 681, email application 682, spreadsheet application 683, browser 684, and other application(s) 685.

In one embodiment, Hydroid OS 660 includes components of a cross-environment communication framework that facilitates communication with Android OS 430 through shared kernel 520. These components include IPC library 663 that includes the base classes for the Binder IPC mechanism of the Android OS and remote communications service 671.

In one embodiment, Hydroid OS 660 is run within a chrooted (created with the 'chroot' command) secondary execution environment created within the Android root environment. Processes and applications within Hydroid OS 660 are run within the secondary execution environment such that the apparent root directory seen by these processes and applications is the root directory of the secondary execution environment. In this way, Hydroid OS 660 can run programs written for standard Linux distributions without modification because Linux user libraries 662 are available to processes running on Hydroid OS 660 in the chrooted secondary execution environment.

Figure 7:
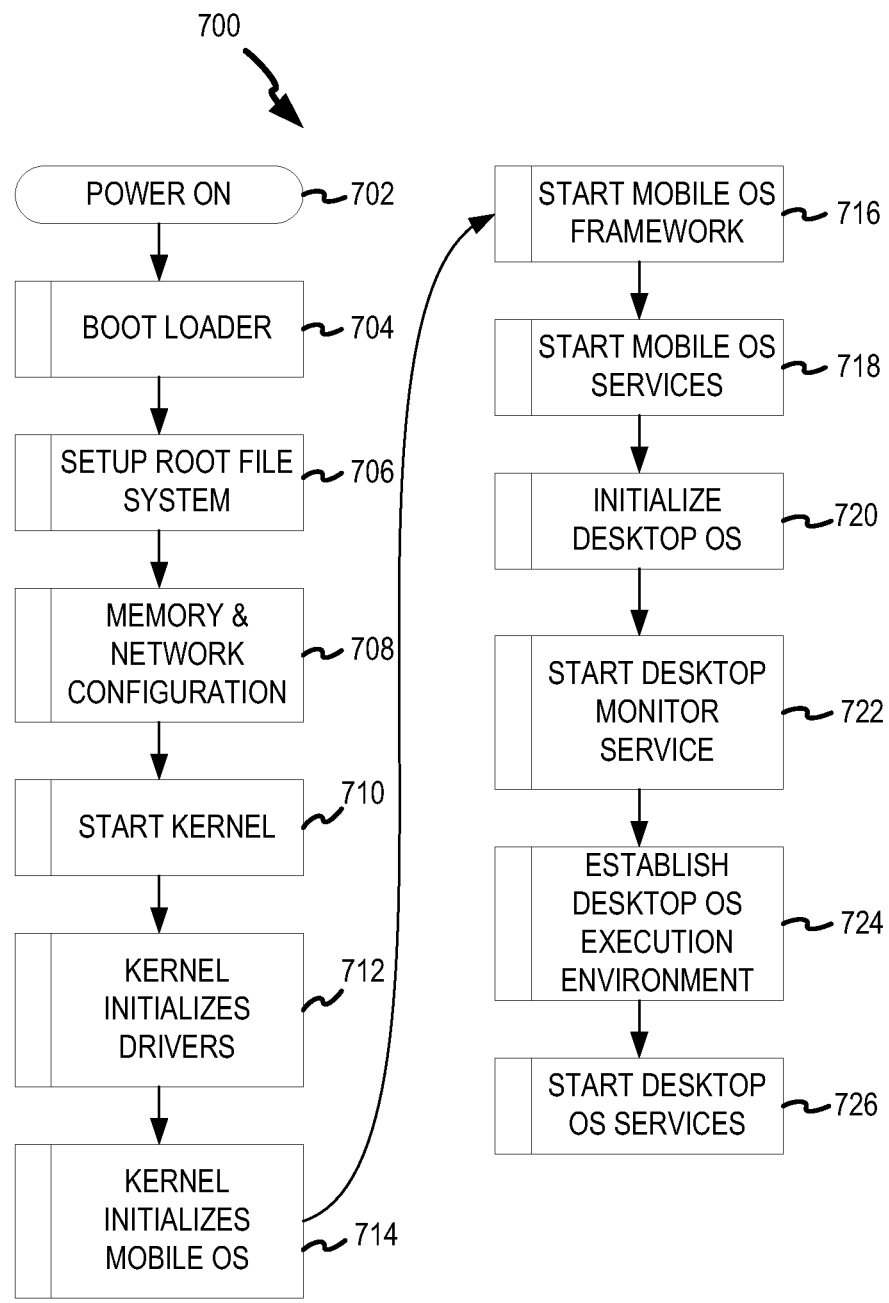
FIG. 7 illustrates an exemplary boot procedure that may be used to configure an operating system architecture of a mobile computing device in more detail, according to various embodiments.

FIG. 7 illustrates an exemplary boot procedure 700 that may be used to boot up the components of OS architecture 300. Boot procedure 700 begins at step 702 when the system is powered on via hardware. For example, the user may turn on mobile computing device 110 via a switch or button. At step 704, the boot loader is loaded in memory (e.g., RAM) with boot arguments passed from hardware or firmware. At step 706, the boot loader sets up the root file system. At step 708, the boot loader configures the memory and network support. In this step, the boot loader may also configure modem support, low memory protection, and security options. At step 710, the boot loader locates shared kernel 320 and loads it to memory, passing kernel arguments as needed. The boot loader starts shared kernel 320, at which point shared kernel 320 takes over control of the boot procedure. In one embodiment, shared kernel 320 is modified Android kernel 520.

At step 712, shared kernel 320 initializes drivers for hardware devices. In this step, shared kernel 320 may also initialize memory protection, virtual memory modules, and schedule caching. At step 714, shared kernel 320 initializes the mobile OS. In one embodiment, the shared kernel runs a user space initialization process to initialize Android OS 430. The initialization process reads a configuration file which describes system services and additional system parameters for Android OS 430. At step 716, the mobile OS framework is started, this generally includes starting runtime environments. In one embodiment, the root process of Android OS 430, Zygote, is run by the initialization process and initializes the Dalvik Virtual Java Machine runtime environment. At step 718, service(s) 344 for the mobile OS are started. Service(s) 344 for the mobile OS generally include telephony services, camera services, GPS services, and/or communications services. In one embodiment, Zygote starts the main Android SystemServer of Android OS 430 which starts Android services such as telephony, camera, Bluetooth, etc.

At step 720, the desktop OS is initialized. In one embodiment, an initialization process of Android OS 430 parses a second configuration file and executes the commands and runs the services configured in the second configuration file. At step 722, a desktop monitor service is started in the mobile OS that starts and monitors the desktop OS. In one embodiment, desktop monitor service 446 is started in Android OS 430. At step 724, the desktop monitor service establishes a separate execution environment for the desktop OS. In one embodiment, desktop monitor service 446 of Android OS 430 uses the Linux chroot command to setup the separate execution environment within the root file system for Hydroid OS 660. A separate execution environment for the desktop OS allows, for example, the desktop OS to have different user libraries than the mobile OS. In one embodiment, user libraries 662 of Hydroid OS 660 are in a separate execution environment of user libraries 432 of Android OS 430. Specifically, applications and programs in each OS can statically or dynamically link to libraries separately within each OS, without linking conflicts or library compatibility problems. At step 726, the desktop monitor service starts the desktop OS service(s) 374. In one embodiment, this includes the X-Window system 674 and Xfce desktop environment 672 of Hydroid OS 660. After step 726, mobile OS 130 and desktop OS 160 are running concurrently and independently on shared kernel 320 on mobile computing device 110.

Figure 8:
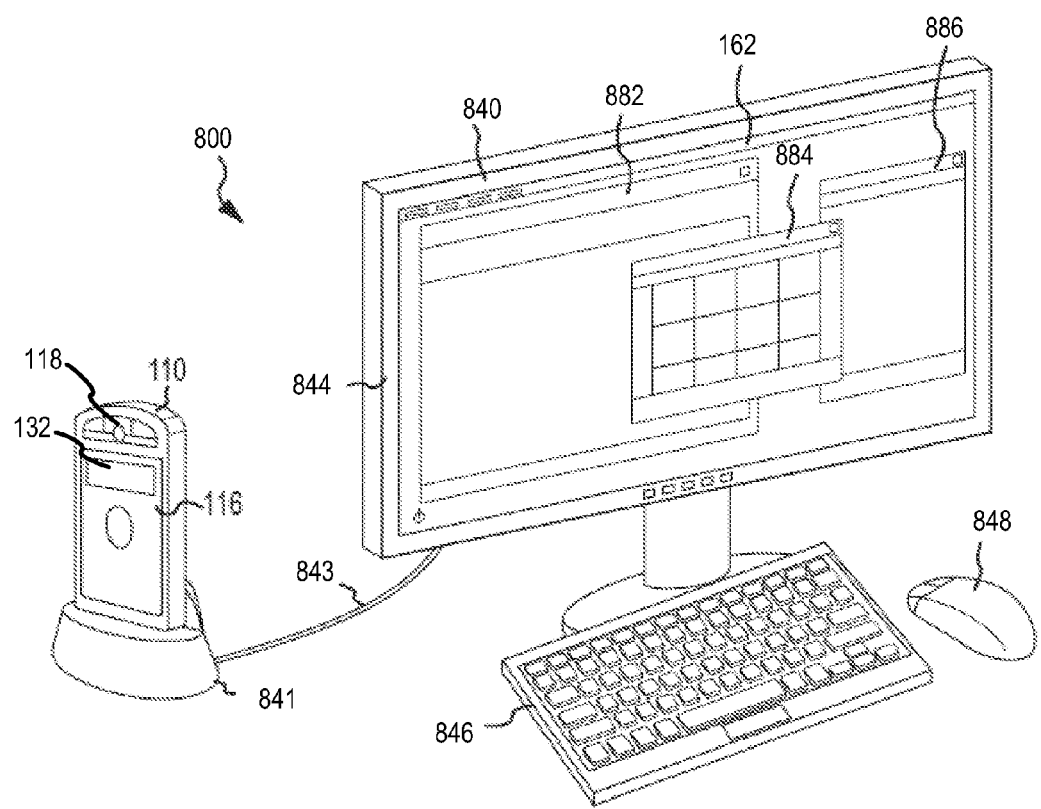
FIG. 8 illustrates aspects of an operating system architecture for a computing environment, according to various embodiments.

FIG. 8 shows an exemplary computing environment 800 in which OS architecture 300 may be employed, according to various embodiments. In computing environment 800, mobile OS 130 provides a mobile computing experience through the I/O devices of mobile computing device 110. Specifically, the user can interact with mobile OS 130 through mobile OS GUI 132 on touch-screen 116 and other I/O devices 118 that are integrated in mobile computing device hardware 112 of mobile computing device 110.

At the same time, desktop OS 160 provides a complete desktop computing experience through secondary terminal environment 840. As illustrated in FIG. 8, secondary terminal environment 840 includes dock cradle 841. Dock cradle 841 includes port 842 (not illustrated) that is connected to mobile computing device through interface 122. Dock cradle 841 is connected through interface 843 to display monitor 844, keyboard 846, and/or pointing device(s) 848. FIG. 8 illustrates that desktop OS GUI 162 is displayed on display monitor 844 of secondary terminal environment 840. Applications 382 and 384, running on desktop OS 160, may be displayed in application windows 882, 884, and/or 886 within desktop OS GUI 162.

Figure 9:
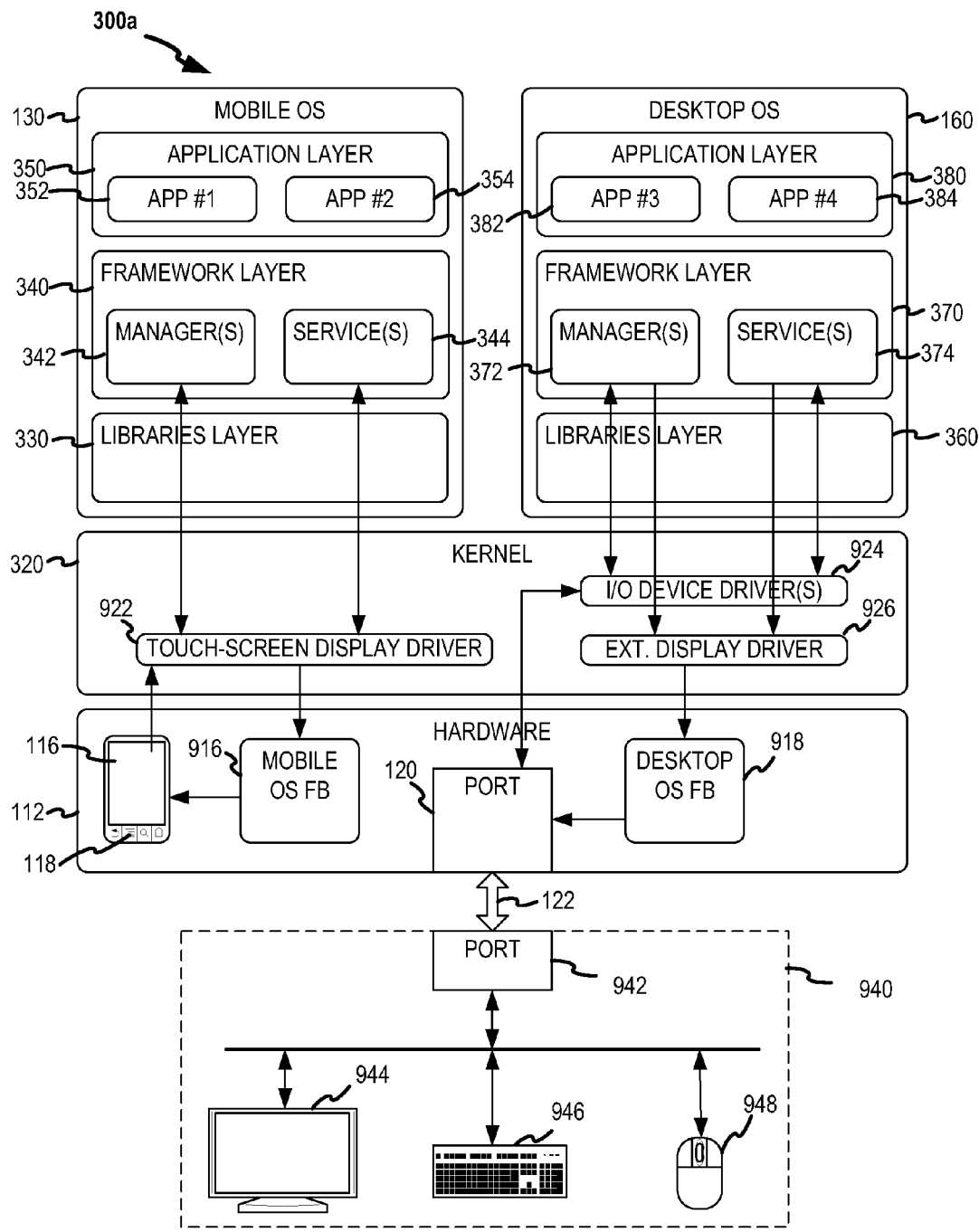
FIG. 9 illustrates an exemplary computing environment employing various aspects of embodiments.

FIG. 9 illustrates OS architecture configuration 300*a* that shows how aspects of OS architecture 300 may provide an enhanced user experience for a docked mobile computing device in more detail. In OS architecture 300*a*, mobile computing device 110 is docked to a secondary terminal environment that includes external monitor 844, keyboard 846, and pointing device(s) 848. For example, from the user's perspective, OS architecture 300*a* may correspond to computing environment 800, as illustrated in FIG. 8. In OS architecture 300*a*, mobile OS 130 is associated with touch screen display 116 on mobile computing device 110 through frame buffer 916. Desktop OS 160 is associated with external display monitor 944 through frame buffer 918. To the user, keyboard 946, pointing device(s) 948, and display monitor 944 operate as an independent desktop computer running its own desktop OS 160, while mobile computing device 110 runs mobile OS 130, which the user interfaces through the mobile OS GUI on touch-screen 116. However, as illustrated in FIG. 9, mobile OS 130 and desktop OS 160 are running on shared kernel 320 on a processor in mobile computing device 110, for example, mobile processor 202 as illustrated in FIG. 2. Running mobile OS 130 and desktop OS 160 on shared kernel 320 provides for the user experience of a mobile computing device through the GUI of mobile OS 130, while providing a full desktop experience through the GUI of desktop OS 160 associated with a secondary terminal environment.

FIG. 9 illustrates aspects of how mobile OS 130 and desktop OS 160 run on shared kernel 320 without the overhead of virtualization. For example, frame buffer 916 and frame buffer 918 are allocated by shared kernel 320 and associated with frame buffer devices in shared kernel 320. Mobile OS 130 renders the mobile OS GUI (including applications 352 and 354) of mobile OS 130 by writing to the frame buffer device in shared kernel 320 associated with frame buffer 516. Touch-screen display driver 922 of shared kernel 320 then writes to mobile OS frame buffer 916 which is output to touch screen 116. Desktop OS 160 renders the desktop OS GUI (including applications 382 and 384) of desktop OS 160 by writing to the frame buffer device in shared kernel 320 associated with frame buffer 918. External display driver 926 of shared kernel 320 then writes to desktop OS frame buffer 918 which is output to display monitor 944 through port 120. In this regard, shared kernel 320 provides direct access to frame buffer memory by both mobile OS 130 and desktop OS 160 through frame buffer devices without virtualization of addressing by either OS.

For example, applications 382 and 384 running on desktop OS 160 may be rendered by desktop OS 160 through the frame buffer device associated with frame buffer 918 in shared kernel 320. In OS architecture 300*a*, frame buffer 918 is displayed on external monitor 944. Applications 382 and 384 may correspond to application windows 882, 884, and/or 886 displayed on external monitor 844, as illustrated in FIG. 8.

Referring again to FIG. 9, input devices attached to mobile computing device 110 are also directly accessible for mobile OS 130 and desktop OS 160 through shared kernel 320 without virtualization. For example, desktop OS 160 can accept input from keyboard 946 and pointing device(s) 948 directly without the need for a virtual device or virtual device file. Specifically, mobile OS 130 and desktop OS 160 can directly access input devices and/or device files of shared kernel 320, without these input devices or device files being translated, mapped, or virtualized.

To improve the user experience in various environments, some embodiments may include various features to facilitate cross-environmental cooperation of multiple operating systems running on a shared kernel. Embodiments of the present invention may include various features for OS management, cross-environment communication, cross-environment application rendering, translation of application data between environments, cross-environment application mirroring.

According to various embodiments, a mobile computing device running a mobile OS and a desktop OS on a shared kernel may be used in a computing system that includes various computing environments. In these embodiments, the mobile computing device may be docked to various devices that extend the functionality of the mobile computing device. For example, the mobile computing device may be docked to a tablet. In this example, the mobile OS GUI may be extended to the screen of the tablet. For example, the mobile OS may be interfaced through a touch-screen of the tablet. Further, the tablet may be docked to a desktop-like terminal environment. When docked to the desktop-like terminal environment, the desktop OS may be resumed and configured for the terminal environment.

In some embodiments, an innovative cross-environment communications framework ("CECF") allows for fast communications between applications in two operating systems running independently and concurrently (e.g., on the same kernel). Embodiments include an extended IPC mechanism that allows for app-to-app communications. For example, applications can register with a remote communication service to be able to communicate (e.g., synchronize data, settings, etc.) in a synchronous and/or asynchronous way.

In other embodiments, seamless translation of application data between two similar applications running in separate operating systems running concurrently and independently on a shared kernel is provided. In embodiments, this may be implemented using a framework like CECF. For example, a mobile spreadsheet application and a desktop spreadsheet application are both installed on a mobile computing device. When the device is un-docked, the mobile application is used with all the spreadsheet data formatted as needed for the mobile-based spreadsheet. When the device is docked in laptop or desktop terminal environment (e.g., smartbook), the desktop spreadsheet program automatically opens with the latest spreadsheet data seamlessly available in the desktop spreadsheet application.

In other embodiments, an application running in one operating system may be displayed within an environment provided by a second operating system, where the two operating systems are running independently and concurrently on a shared kernel. For example, within a desktop environment of a desktop OS, a user can launch a mobile application, which will run from the mobile OS (e.g., through an X11-type terminal, not by porting the application or running a virtualized mobile OS). Notably, the mobile application can be any mobile application stored on the mobile device, regardless of whether the application is currently being displayed in the mobile OS GUI.

In other embodiments, applications running in a first OS may be displayed within an environment provided by a second OS, where the two operating systems are running independently and concurrently on a shared kernel. Graphics data for the first OS is directly accessed by the second OS. Specifically, all surfaces for applications in the first OS are kept in a shared memory space. The graphics server of the first OS communicates to a client application in the second OS by passing file descriptors to the memory allocated for the surfaces. In one implementation, a chrooted Linux operating system (i.e., Hydroid) and an Android operating system concurrently run on a single Android kernel on a mobile device. An X11 client in Hydroid connects to the graphics server ("SurfaceFlinger") in Android to request information for a certain surface, and a service within Android ("Hydroid Bond") registers the X11 client to receive draw notifications for the surface.

In other embodiments, a mobile computing device detects a docked environment and configures a second OS to take advantage of the docked environment, where the second OS runs independently and concurrently with a first OS on a shared kernel. In one implementation, a chrooted Linux operating system (i.e., Hydroid) and an Android operating system concurrently run on a single Linux kernel on a mobile device. When the mobile device is not docked the Android operating system is tailored to the context (e.g., input/output capabilities, power management, communications, etc.) of the mobile device. When the mobile device is docked with a laptop, the mobile device automatically detects the laptop environment and configures the Linux environment to fully utilize that laptop environment.

In other embodiments, a mobile computing device automatically detects a docked environment and wakes up a suspended, full-featured, secondary operating system for use in the docked environment. In one implementation, a chrooted Linux operating system (i.e., Hydroid) and an Android operating system always concurrently run on a single Linux kernel on a mobile device. When the mobile device is not docked the Android operating system drives the mobile device display, etc., and the Linux operating system is in a suspended mode (e.g., it can still exploit the CECF). When the mobile device is docked with a laptop, the mobile device automatically detects the laptop environment and wakes up the Linux operating system to support the laptop environment.

In other embodiments, an application running in a first OS is mirrored to a display window of a second OS (e.g., on a separate display), where the two operating systems are running independently and concurrently on a shared kernel. For example, a display associated with the second OS (i.e., the second OS GUI) displays a window in which the first OS GUI is mirrored. Embodiments effectively implement this functionality by copying the frame buffer from the mobile environment to the desktop environment. Notably, the window may substantially mimic use of the mobile device (rather than generally being able to run mobile applications).

In other embodiments, full interaction support of a docked environment to redirected and/or mirrored applications is provided. For example, a mobile computing device may be configured with limited touchscreen capability and no keyboard, mouse, or other input device. The mobile device is docked in a tablet having advanced touchscreen and stylus support, and a connected external keyboard. When a mobile application is displayed in the desktop environment on the tablet display, a user can interact with the mobile application using the full input/output capabilities of the tablet environment, even if the same application being displayed on the mobile device would have more limited interactivity.

As described above, in one embodiment an Android mobile OS and a Linux desktop OS (i.e., Hydroid) run concurrently on the same shared kernel of a single mobile computing device. The Android mobile OS provides a mobile computing experience through mobile computing hardware and the Linux desktop OS provides a desktop computing experience through a secondary terminal environment having a user experience profile associated with the Linux OS. However, other OS combinations are contemplated as within various embodiments of the invention. For example, various aspects of the invention may be used to run Windows Mobile and Windows 7 on a shared kernel or sharing common kernel-mode processes. As another example, iOS and Mac OS X running on a shared kernel is also within the scope of various embodiments. Furthermore, aspects of the invention may be used advantageously by combinations of embedded OS's and desktop or mobile OS's running on a shared kernel.

The foregoing description has been presented for purposes of illustration and description.

Furthermore, the description is not intended to limit embodiments of the invention to the form disclosed herein. While a number of exemplary aspects and embodiments have been discussed above, those of skill in the art will recognize certain variations, modifications, permutations, additions, and sub-combinations thereof.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material.

Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A computing system, comprising:
   a first computing device, comprising:
   a mobile operating system running in a first execution environment on a shared kernel, the mobile operating system having a first application framework supporting a first application;
   a desktop operating system running concurrently with the mobile operating system in a second execution environment on the shared kernel, the desktop operating system having a second application framework supporting a second application, wherein the second application is incompatible with the first application framework; and
   a second computing device providing a desktop computing experience;
   wherein the first computing device is a mobile computing device providing a mobile computing experience;
   wherein each of the mobile operating system and the desktop operating system run concurrently and independently on the shared kernel of the mobile computing device;
   wherein the second computing device is distinct from the first computing device;
   wherein when the mobile computing device is connected to the second computing device, a user experiences the second application on a display of the second computing device through the desktop computing experience of the second device;

wherein the shared kernel allocates a first frame buffer memory associated with the mobile operating system and allocates a second frame buffer memory associated with the desktop operating system;

wherein the mobile operating system renders the first application in the first frame buffer memory through the shared kernel and the desktop operating system renders the second application in the second frame buffer memory through the shared kernel; and wherein the shared kernel provides direct access to the first frame buffer memory and the second frame buffer memory by the respective mobile operating system and desktop operating system through frame buffer devices without virtualization of addressing by either operating system.

2. The computing system of claim 1, wherein the mobile operating system includes a first set of user libraries in the first execution environment, and wherein the second application is incompatible with the first set of user libraries.

3. The computing system of claim 1, wherein the shared kernel is running on a mobile processor of the first computing device.

4. The computing system of claim 1, wherein the desktop operating system is associated with the second computing device.

5. The computing system of claim 1, wherein the first computing device and the second computing device are connected with a single dock connector that includes a display interface and serial communications interface.

6. The computing system of claim 1, the first computing device further including a physical memory device, wherein the mobile operating system is associated with the first frame buffer in the physical memory device and the desktop operating system is associated with the second frame buffer in the physical memory device.

7. The computing system of claim 6, wherein the first computing device further includes a first display device, and wherein the first frame buffer is associated with the first display device.

8. The computing system of claim 7, wherein the second computing device includes a second display device, and wherein the second frame buffer is associated with the second display device.

9. The computing system of claim 8, wherein the second application is displayed on the second display device through the second frame buffer.

10. The computing system of claim 1, the first computing device further including a physical storage device, wherein the second execution environment is logically isolated from the first execution environment on the physical storage device.

11. The computing system of claim 1, further including an input device connected to the first computing device, wherein input commands from the input device are available to the mobile operating system in the first execution environment and to the desktop operating system in the second execution environment.

12. The computing system of claim 11, wherein the desktop operating system accesses input commands from the input device through the shared kernel.

13. The computing system of claim 1, wherein the first computing device is configured using a boot process that includes the steps of:

starting, in response to a power on event, a boot loader;

establishing, by the boot loader, the first execution environment;

starting, by the boot loader, the shared kernel;

initializing, by the shared kernel, the mobile operating system;

starting, by the shared kernel, the first application framework;

starting, in the mobile operating system, a desktop monitor service;

establishing, by the desktop monitor service, the second execution environment within the first execution environment; and starting, by the desktop monitor service, the second application framework.

14. A method of providing multiple operating systems on a single physical processor of a mobile computing device, the method comprising:

running a first application on a mobile operating system of the mobile computing device, the mobile operating system running on a shared kernel and having a first application framework, the mobile computing device providing a mobile computing experience;

running a second application on a desktop operating system, the desktop operating system running concurrently with the mobile operating system on the shared kernel and having a second application framework, wherein the second application is incompatible with the first application framework;

providing a second computing device providing a desktop computing experience;

allocating, by the shared kernel, a first frame buffer memory associated with the mobile operating system;

allocating, by the shared kernel, a second frame buffer memory associated with the desktop operating system;

rendering, by the mobile operating system, the first application in the first frame buffer memory through the shared kernel; and rendering, by the desktop operating system, the second application in the second frame buffer memory through the shared kernel;

wherein each of the mobile operating system and the desktop operating system run concurrently and independently on the shared kernel of the mobile computing device;

wherein the second computing device is distinct from the first computing device;

wherein when the mobile computing device is connected to the second computing device, a user experiences the second application on a display of the second computing device through the desktop computing experience of the second device;

wherein the mobile operating system renders the first application in the first frame buffer memory through the shared kernel and the desktop operating system renders the second application in the second frame buffer memory through the shared kernel; and wherein the shared kernel provides direct access to the first frame buffer memory and the second frame buffer memory by the respective mobile operating system and desktop operating system through frame buffer devices without virtualization of addressing by either operating system.

15. The method of claim 14, wherein graphics data for the mobile operating system is directly accessed by the desktop operating system, wherein a graphics server of the mobile operating system communicates to a client application in the desktop operating system by passing file descriptors to shared memory allocated for application surfaces.

16. The computing system of claim 1, wherein graphics data for the mobile operating system is directly accessed by the desktop operating system, wherein a graphics server of the mobile operating system communicates to a client application in the desktop operating system by passing file descriptors to shared memory allocated for application surfaces.

17. A computing system including a first computing device comprising a computer-readable medium storing instructions for a physical processor, the instructions, when executed, causing the processor to perform steps comprising:

running a mobile operating system in a first execution environment on a shared kernel, the mobile operating system having a first application framework supporting a first application;

running a desktop operating system concurrently with the mobile operating system in a second execution environment on the shared kernel, the desktop operating system having a second application framework supporting a second application, wherein the second application is incompatible with the first application framework, wherein each of the mobile operating system and the desktop operating system run concurrently and independently on the shared kernel of the first computing device, wherein the first computing device is a mobile computing device providing a mobile computing experience;

providing a second computing device providing a desktop computing experience;

allocating, by the shared kernel, a first frame buffer memory associated with the mobile operating system and allocating, by the shared kernel, a second frame buffer memory associated with the desktop operating system; and rendering, by the mobile operating system, the first application in the first frame buffer memory through the shared kernel, and rendering, by the desktop operating system, the second application in the second frame buffer memory through the shared kernel;

wherein the second computing device is distinct from the first computing device;

wherein when the mobile computing device is connected to the second computing device, a user experiences the second application on a display of the second computing device through the desktop computing experience of the second device; and wherein the shared kernel provides direct access to the first frame buffer memory and the second frame buffer memory by the respective mobile operating system and desktop operating system through frame buffer devices without virtualization of addressing by either operating system.

18. The computing system of claim 17, wherein the second execution environment comprises a chrooted environment.

19. The computing system of claim 17, further comprising mobile telephony capabilities.

20. The computing system of claim 17, wherein the first computing device comprises a smartphone.

\* \* \* \* \*